(12) United States Patent  
Kawakami et al.

(10) Patent No.: US 10,632,709 B2  
(45) Date of Patent: Apr. 28, 2020

(54) HONEYCOMB STRUCTURE

(71) Applicant: NGK INSULATORS, LTD., Nagoya (JP)

(72) Inventors: Akifumi Kawakami, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/453,069

(22) Filed: Mar. 8, 2017

(65) Prior Publication Data

US 2017/0266908 A1  Sep. 21, 2017

(30) Foreign Application Priority Data

Mar. 17, 2016 (JP) .................................. 2016-054358

(51) Int. Cl.
*B32B 3/12* (2006.01)
*F01N 13/00* (2010.01)
*F01N 3/28* (2006.01)

(52) U.S. Cl.
CPC .............. *B32B 3/12* (2013.01); *F01N 3/2828* (2013.01); *F01N 13/0097* (2014.06)

(58) Field of Classification Search
CPC ...... B32B 3/12; F01N 13/0097; F01N 3/2828
See application file for complete search history.

(56) References Cited

U.S. PATENT DOCUMENTS

| | | | | |
|---|---|---|---|---|
| 4,448,828 A * | 5/1984 | Mochida | ................ | B01D 53/86 428/34.4 |
| 4,810,554 A * | 3/1989 | Hattori | ..................... | B01J 35/04 428/116 |
| 5,108,685 A * | 4/1992 | Kragle | .................... | B28B 3/269 264/177.12 |
| 5,538,697 A * | 7/1996 | Abe | ..................... | B01D 53/945 422/169 |

(Continued)

FOREIGN PATENT DOCUMENTS

| DE | 41 41 497 A1 | 6/1992 |
|---|---|---|
| DE | 199 38 038 A1 | 5/2000 |

(Continued)

OTHER PUBLICATIONS

Japanese Office Action, Japanese Application No. 2016-054358, dated Jun. 25, 2019 (3 pages).

(Continued)

*Primary Examiner* — David Sample
*Assistant Examiner* — Elizabeth Collister
(74) *Attorney, Agent, or Firm* — Burr & Brown, PLLC

(57) ABSTRACT

The honeycomb structure includes a pillar-shaped honeycomb structure body having porous partition walls, as to the honeycomb structure body, in a plane perpendicular to a cell extending direction, a cell structure of a central cell structure differs from a cell structure of a circumferential cell structure, and in the plane, a geometric center of gravity of the honeycomb structure body exists at a position which is away from a geometric center of gravity of the central cell (Continued)

structure, and a distance between the respective centers of gravity is larger than a length of a half of a cell pitch of an outermost circumferential cell structure including complete cells formed at an outermost circumference of the honeycomb structure body.

8 Claims, 7 Drawing Sheets

(56) References Cited

U.S. PATENT DOCUMENTS

| | | | | |
|---|---|---|---|---|
| 7,410,929 | B2* | 8/2008 | Ichikawa | B01D 53/885 |
| | | | | 422/177 |
| 9,073,289 | B2* | 7/2015 | Tamai | B01D 46/247 |
| 9,156,742 | B2* | 10/2015 | Hayashi | F01N 3/2828 |
| 9,403,339 | B2* | 8/2016 | Murata | B01D 46/247 |
| 9,533,294 | B2* | 1/2017 | Hayashi | B01J 32/00 |
| 9,782,723 | B2* | 10/2017 | Aoki | B01D 53/9431 |
| 9,782,753 | B2* | 10/2017 | Aoki | B01D 53/9422 |
| 2002/0042344 | A1 | 4/2002 | Kondo et al. | |
| 2002/0117773 | A1* | 8/2002 | Yamada | B01D 53/885 |
| | | | | 264/209.1 |
| 2004/0131512 | A1 | 7/2004 | Fumio et al. | |
| 2011/0162348 | A1* | 7/2011 | Kim | F01N 3/2066 |
| | | | | 60/274 |
| 2015/0275726 | A1 | 10/2015 | Tamai et al. | |
| 2017/0266908 | A1* | 9/2017 | Kawakami | B32B 3/12 |
| 2017/0274554 | A1* | 9/2017 | Kawakami | F01N 3/26 |
| 2017/0312688 | A1* | 11/2017 | Crawford | C04B 38/0012 |
| 2017/0326539 | A1* | 11/2017 | Aoki | B01J 35/04 |

FOREIGN PATENT DOCUMENTS

| | | |
|---|---|---|
| GB | 2 342 055 A | 4/2000 |
| JP | 2000-097019 A1 | 4/2000 |
| JP | 2002-177794 A1 | 6/2002 |
| JP | 2008-018370 A1 | 1/2008 |
| JP | 2015-192988 A | 11/2015 |

OTHER PUBLICATIONS

German Office Action (with English translation), German Application No. 10 2017 002 265.8, dated Apr. 5, 2019 (7 pages).

* cited by examiner

HONEYCOMB STRUCTURE

The present application is an application based on JP-2016-54358 filed on Mar. 17, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure in which deformation of cells defined by partition walls, especially the deformation of the cells formed on a circumferential side of the honeycomb structure is effectively inhibited and which has an excellent mechanical strength.

Description of the Related Art

Heretofore, a honeycomb structure onto which a catalyst is loaded has been used for a purification treatment of harmful substances such as HC, CO and $NO_x$ included in an exhaust gas emitted from an engine of a car or the like. The honeycomb structure is also used as an exhaust gas purifying filter in which open ends of cells defined by porous partition walls are plugged.

The honeycomb structure is a pillar-shaped structure having partition walls defining a plurality of cells which function as through channels for a fluid. Such a honeycomb structure has, in its plane perpendicular to an extending direction of the cells, a cell structure in which the plurality of cells is regularly arranged in a predetermined cycle. Heretofore, one honeycomb structure has one type of cell structure in the above plane, but in recent years, there has been suggested a honeycomb structure having two or more types of cell structures in the above plane, for the purpose of improvement of an exhaust gas purification efficiency. For example, there has been suggested a honeycomb structure in which a cell density or a cell shape varies in a central portion and a circumferential portion of a plane perpendicular to a cell extending direction, whereby the honeycomb structure has two or more types of cell structures in the above plane (for example, see Patent Documents 1 to 3).

[Patent Document 1] JP-A-2002-177794
[Patent Document 2] JP-A-2008-018370
[Patent Document 3] JP-A-2000-097019

SUMMARY OF THE INVENTION

As a honeycomb structure having two or more types of cell structures, for example, in Patent Documents 1 to 3, there are disclosed honeycomb structures each of which is configured so that in a plane perpendicular to a cell extending direction, a cell density of a central portion is higher and a cell density of a circumferential portion is lower. Such a honeycomb structure is usually configured so that in the above plane, a geometric center of gravity of the cell structure of the central portion coincides with a center of gravity of the honeycomb structure.

Heretofore, as one forming method of a honeycomb formed body, there has been known a forming method of extruding the honeycomb formed body in a horizontal direction. This forming method includes attaching a die of a desired shape to an extruder in which an extruding direction is set to the horizontal direction, and extruding a ceramic raw material from the die in the horizontal direction to form a pillar-shaped honeycomb formed body. Here, the honeycomb formed body immediately after being extruded is very soft and easily deformable. To obtain a high quality formed body, it is necessary to support and convey, to respective steps, the honeycomb formed body immediately after being extruded so that the honeycomb formed body is not deformed. Usually, as a receiving base which supports the honeycomb formed body, there is used a receiving base having a support surface which is complementary to a side surface shape of the honeycomb formed body, and this receiving base supports, from the downside, the honeycomb formed body to be extruded out in the horizontal direction.

Using the receiving base having the support surface which is complementary to the side surface shape of the honeycomb formed body enables an outer shape of the honeycomb formed body to be inhibited from being noticeably deformed. However, even when such a receiving base as described above is used, cells at an outermost circumference which are present vertically below a center of gravity of the honeycomb formed body are noticeably influenced by the weight of the honeycomb formed body itself, and hence the cells at the outermost circumference might partially be deformed. Especially, in the honeycomb structure having two or more cell structures as described above, in a case where the cell structure of the central portion is denser, a larger load is easily applied to the outermost circumference of the honeycomb formed body, which has caused the problem that the cells at the outermost circumference of the honeycomb formed body are especially easily deformable. As a result, in the honeycomb structure obtained by firing such a honeycomb formed body, cracks are easily generated from deformed cells which are start points, and a strength of the honeycomb structure is insufficient.

The present invention has been developed in view of problems of such conventional technologies. According to the present invention, there is provided a honeycomb structure in which deformation of cells defined by partition walls, especially deformation of cells formed on a circumferential side of the honeycomb structure is effectively inhibited and which has an excellent mechanical strength.

According to the present invention, there is provided a honeycomb structure as follows.

According to a first aspect of the present invention, a honeycomb structure is provided comprising:

a pillar-shaped honeycomb structure body having porous partition walls defining a plurality of cells which extend from an inflow end face to an outflow end face and function as through channels for a fluid, wherein as to the honeycomb structure body, in a plane perpendicular to an extending direction of the cells, a cell structure of a central cell structure comprising the plurality of cells formed in a central portion differs from a cell structure of a circumferential cell structure comprising the plurality of cells formed in a circumferential portion on a side outer than the central cell structure, in the plane perpendicular to the cell extending direction, a geometric center of gravity of the honeycomb structure body exists at a position which is away from a geometric center of gravity of the central cell structure, and a distance between the respective centers of gravity is larger than a length of a half of a cell pitch of an outermost circumferential cell structure including complete cells formed at an outermost circumference of the honeycomb structure body in the circumferential cell structure, in a case where among the cells, cells having all peripheries defined by the partition walls are defined as the complete cells.

According to a second aspect of the present invention, the honeycomb structure according to the above first aspect is provided, wherein in the plane perpendicular to the cell extending direction, the distance between the center of gravity of the honeycomb structure body and the center of gravity of the central cell structure is larger than a length of the cell pitch of the outermost circumferential cell structure.

According to a third aspect of the present invention, the honeycomb structure according to the above second aspect is provided, wherein in the plane perpendicular to the cell extending direction, the distance between the center of gravity of the honeycomb structure body and the center of gravity of the central cell structure is larger than twice of the length of the cell pitch of the outermost circumferential cell structure.

According to a fourth aspect of the present invention, the honeycomb structure according to any one of the above first to third aspects is provided, wherein the honeycomb structure body has a porous boundary wall in a boundary portion between the circumferential cell structure and the central cell structure.

According to a fifth aspect of the present invention, the honeycomb structure according to any one of the above first to third aspects is provided, wherein in the honeycomb structure body, the boundary portion between the circumferential cell structure and the central cell structure comprises continuous or discontinuous partition walls.

According to a sixth aspect of the present invention, the honeycomb structure according to any one of the above first to fifth aspects is provided, wherein a cell density of the central cell structure is larger than a cell density of the outermost circumferential cell structure.

According to a seventh aspect of the present invention, the honeycomb structure according to any one of the above first to sixth aspects is provided, wherein the central cell structure comprises two or more cell structures having different cell densities.

According to an eighth aspect of the present invention, the honeycomb structure according to any one of the above first to seventh aspects is provided, wherein a cell shape of all the complete cells is quadrangular shape, and an arrangement direction of repeating units of the cells in the central cell structure tilts as much as 10° or more and 45° or less to an arrangement direction of repeating units of the cells in the outermost circumferential cell structure.

The honeycomb structure of the present invention exhibits effects that deformation of cells defined by partition walls, especially deformation of cells formed at an outermost circumference of the honeycomb structure is effectively inhibited and that the honeycomb structure has an excellent mechanical strength. Especially, in the honeycomb structure of the present invention, a cell structure of a central cell structure differs from a cell structure of a circumferential cell structure. Furthermore, in the honeycomb structure of the present invention, a geometric center of gravity of a honeycomb structure body is present at a position which is away from a geometric center of gravity of the central cell structure as much as a distance longer than a length of a half of a cell pitch of an outermost circumferential cell structure. In the honeycomb structure of the present invention having such a structure, when a honeycomb formed body obtained by extruding a ceramic raw material is supported on a receiving base during its manufacturing, stress to be applied to an outermost circumference of the honeycomb formed body can be dispersed. Consequently, even when the honeycomb structure is manufactured through manufacturing steps of supporting the honeycomb formed body on the receiving base and then conveying the honeycomb formed body to the respective steps, the deformation of the cells formed at the outermost circumference of the honeycomb formed body is hard to occur. Therefore, in the honeycomb structure of the present invention, the deformation of the cells formed at the outermost circumference is inhibited, and the honeycomb structure has an excellent mechanical strength. For example, when the cells formed at the outermost circumference are deformed, cracks are easily generated from the deformed cells which are start points, but the honeycomb structure of the present invention can effectively prevent the generation of the cracks.

DESCRIPTION OF THE PREFERRED EMBODIMENTS

Figure 1:
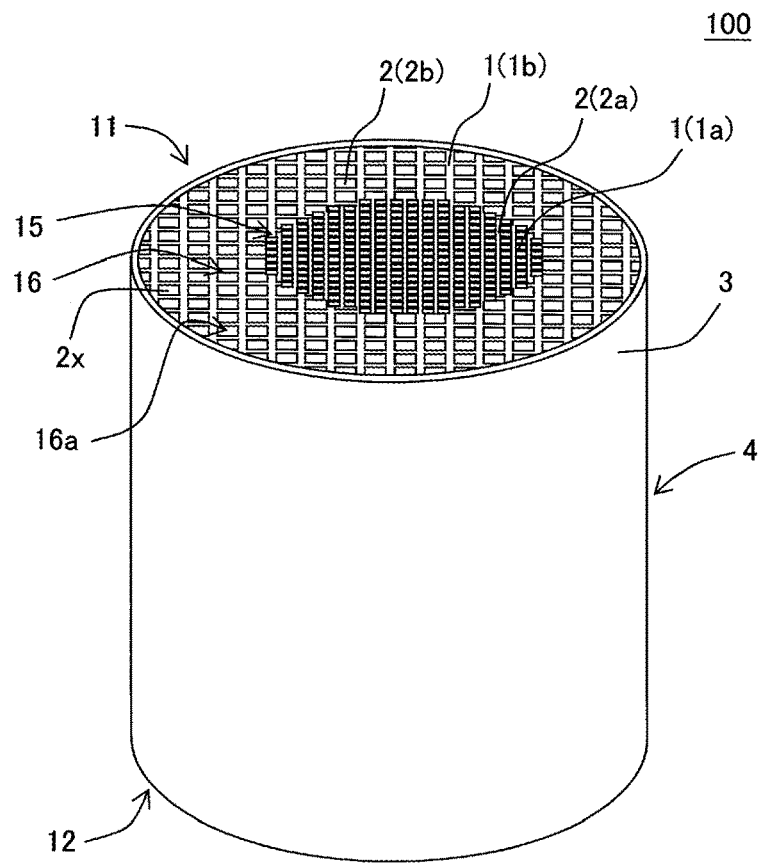
FIG. 1 is a perspective view schematically showing a honeycomb structure according to an embodiment of the present invention.

Hereinafter, embodiments of the present invention will be described. However, the present invention is not limited to the following embodiments. Therefore, it should be understood that modifications, improvements and the like can suitably be added to the following embodiments on the basis of ordinary knowledge of a person skilled in the art without departing from the gist of the present invention.

(1) Honeycomb Structure:

As shown in FIG. 1 to FIG. 5, a honeycomb structure according to an embodiment of the present invention is directed to a honeycomb structure 100 including a pillar-shaped honeycomb structure body 4 having porous partition walls 1. The partition walls 1 of the honeycomb structure body 4 define a plurality of cells 2 which extend from an inflow end face 11 to an outflow end face 12 and function as through channels for a fluid. The honeycomb structure 100 of the present embodiment is characterized in that the honeycomb structure body 4 is configured as follows. In a plane perpendicular to the extending direction of the cells 2, the honeycomb structure body 4 has a central cell structure 15 and a circumferential cell structure 16, and the cell structure of the central cell structure 15 differs from the cell structure of the circumferential cell structure 16. Here, the central cell structure 15 is referred to as a cell structure comprising a plurality of cells 2a formed in a central portion of the honeycomb structure body 4 in the above plane. The circumferential cell structure 16 is referred to as a cell structure comprising a plurality of cells 2b formed in a circumferential portion on a side outside of the central cell structure 15. The cells 2b are referred to as the plurality of cells 2b formed in the circumferential portion on the outer side than the central cell structure 15.

In the honeycomb structure 100 of the present embodiment, in the plane perpendicular to the extending direction of the cells 2, a geometric center O1 of gravity of the honeycomb structure body 4 is present at a position which is away from a geometric center O2 of gravity of the central cell structure 15. Further, a distance between respective centers of gravity, i.e., a distance between the center O1 of gravity and the center O2 of gravity is larger than a length of a half of a cell pitch of an outermost circumferential cell structure 16a. Here, the outermost circumferential cell structure 16a is referred to as a cell structure including complete cells 2x formed at an outermost circumference of the honeycomb structure body 4 in the circumferential cell structure 16. Details of "the outermost circumferential cell structure 16a" and "the complete cells 2x" will be described later.

The honeycomb structure 100 of the present embodiment exhibits the effects that deformation of the cells 2 defined by the partition walls 1, especially deformation of the cells 2 formed at the outermost circumference of the honeycomb structure 100 is effectively inhibited and that the honeycomb structure has an excellent mechanical strength. In the honeycomb structure 100 of the present embodiment, when a honeycomb formed body obtained by extruding a ceramic raw material is supported on a receiving base during its manufacturing, it is possible to disperse a stress to be applied to an outermost circumference of the honeycomb formed body. Consequently, even when the honeycomb structure is manufactured through manufacturing steps of supporting the honeycomb formed body on the receiving base and then conveying the honeycomb formed body to the respective steps, the cells formed at the outermost circumference of the honeycomb formed body is hardly deformed. Therefore, in the honeycomb structure 100 of the present embodiment, the deformation of the cells 2 formed at the outermost circumference is inhibited, and the honeycomb structure has an excellent mechanical strength.

Figure 2:
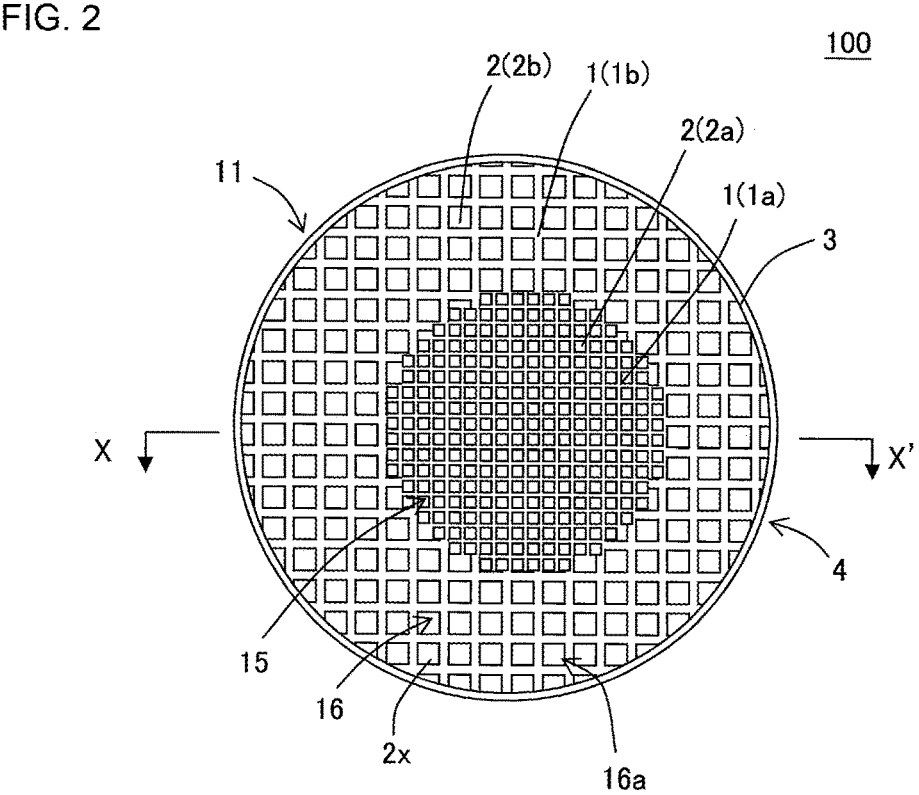
FIG. 2 is a plan view schematically showing an inflow end face of the honeycomb structure shown in FIG. 1.
Figure 3:
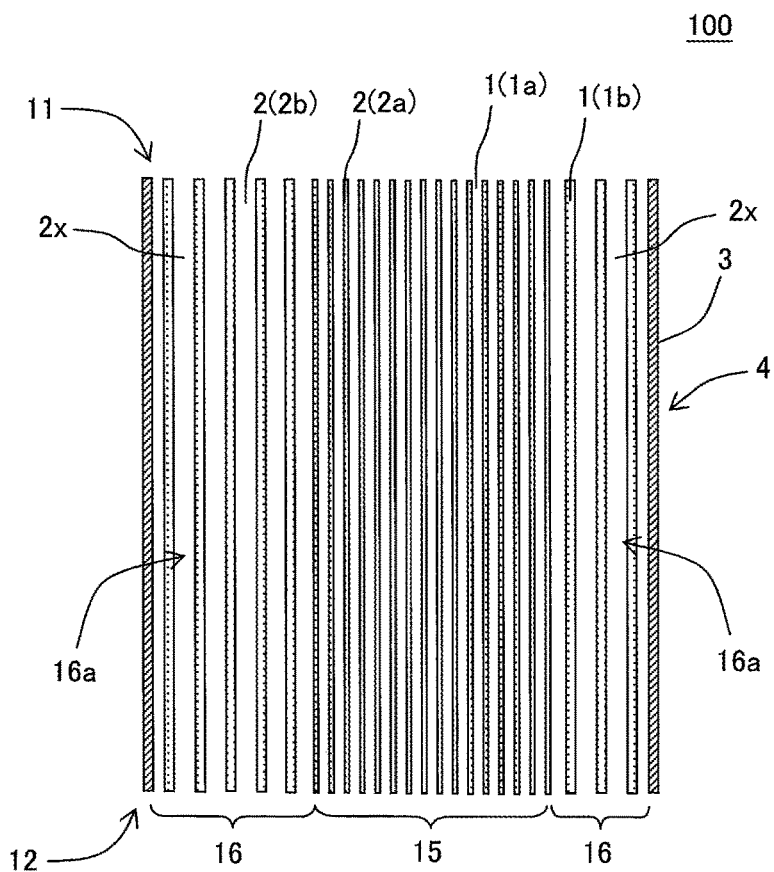
FIG. 3 is a cross-sectional view schematically showing a cross section along the X-X' line of FIG. 2.
Figure 4:
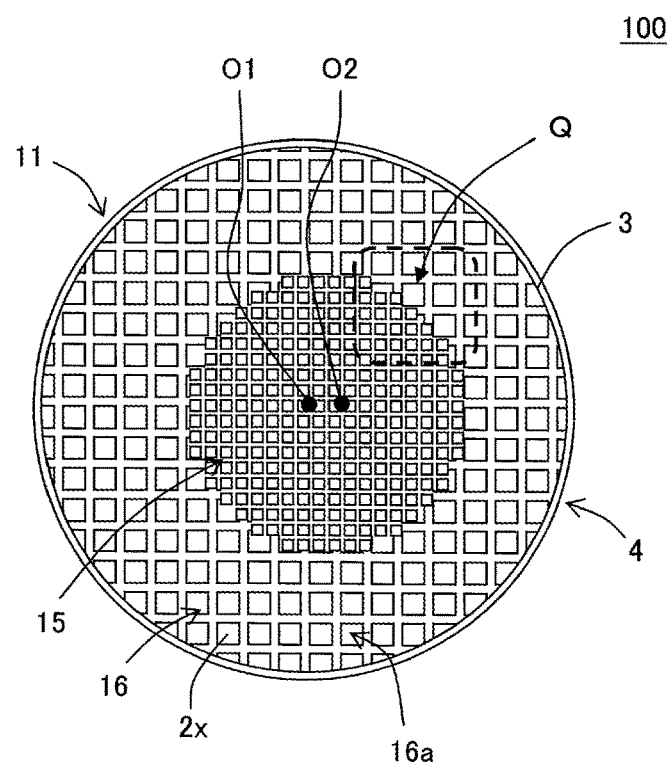
FIG. 4 is a plan view schematically showing the inflow end face of the honeycomb structure shown in FIG. 1, to explain a geometric center of gravity of a honeycomb structure body and a geometric center of gravity of a central cell structure.
Figure 5:
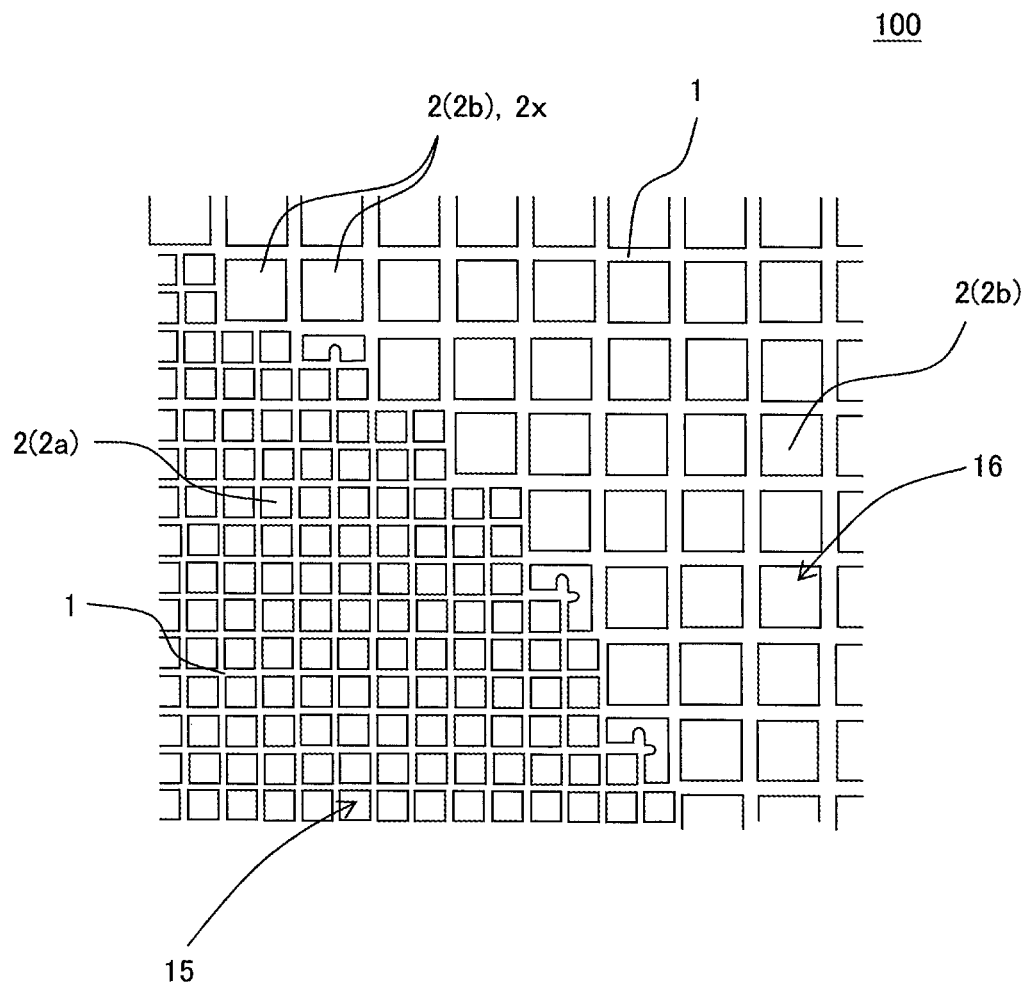
FIG. 5 is an enlarged plan view in which a range surrounded with a broken line denoted with symbol Q of FIG. 4 is enlarged.

Here, FIG. 1 is a perspective view schematically showing a honeycomb structure according to an embodiment of the present invention. FIG. 2 is a plan view schematically showing an inflow end face of the honeycomb structure shown in FIG. 1. FIG. 3 is a cross-sectional view schematically showing a cross section along the X-X' line of FIG. 2. FIG. 4 is a plan view schematically showing the inflow end face of the honeycomb structure shown in FIG. 1, to explain the geometric center of gravity of the honeycomb structure body and the geometric center of gravity of the central cell structure. FIG. 5 is an enlarged plan view in which a range surrounded with a broken line denoted with symbol Q of FIG. 4 is enlarged.

In the present invention, the outermost circumferential cell structure 16a is a cell structure including the complete cells 2x formed at the outermost circumference of the honeycomb structure body 4. Hereinafter, the cells 2 having all peripheries of the cells 2 defined by the partition walls 1 will be referred to as "the complete cells" sometimes. On the other hand, when all the peripheries of the cells 2 are not defined by the partition walls 1 and parts of the cells 2 are defined by a circumferential wall 3, the cells 2 will be referred to as "incomplete cells" sometimes. Furthermore, when parts of the cells 2 are defined by a boundary wall 8 (see FIG. 7) as described later, the cells 2 will be also referred to as "the incomplete cells" sometimes. The cells 2 formed in the honeycomb structure body 4 can be classified into "the complete cells" and "the incomplete cells" as described above.

In the present invention, "the cell structure" is referred to as a structure in which in the plane perpendicular to the extending direction of the cells 2, one of the cells 2 defined by the partition walls 1 or any combination of the plurality of cells 2 is one repeating unit and which is formed of a set of the repeating units. For example, in a case in which the cells having the same shape are regularly arranged in the plane described above, a region in which the cells having the same shape are arranged forms one cell structure. Further, in a case in which a combination of the plurality of the cells having different shapes forms one repeated unit, a region in which the repeated unit is arranged forms one cell structure.

In the present invention, when two cell structures are "different cell structures", it is meant that any one of a partition wall thickness, a cell density and a cell shape differs in a case where the two cell structures are compared. Here, when the cell structures are "different in partition wall thickness", it is indicated that the cell structures have a difference of 25 μm or more in a case where the partition wall thicknesses of the two cell structures are compared. Furthermore, when the cell structures are "different in cell density", it is indicated that the cell structures have a difference of 7 cells/cm$^2$ or more in a case where the cell densities of the two cell structures are compared.

In the present invention, "the central cell structure 15" comprises one or more cell structures. Therefore, in "the central cell structure 15", in a case where one cell structure is only present on an inner side than the circumferential cell structure 16, the one cell structure becomes the central cell structure 15, and in a case where two or more cell structures are present, each of the two or more cell structures becomes the central cell structure 15.

On the other hand, "the circumferential cell structure 16" is a cell structure which comprises a plurality of cells 2b formed in a circumferential portion on the outer side than the central cell structure 15 and which includes at least the outermost circumferential cell structure 16a formed in an outermost circumferential portion of the honeycomb structure body 4. "The outermost circumferential cell structure 16a" comprises one type of cell structure. In a case where "the circumferential cell structure 16" comprises only "the outermost circumferential cell structure 16a", "the outermost circumferential cell structure 16a" is the same as "the circumferential cell structure 16". It is to be noted that in the cell structure which is comprised the outermost circumferential cell structure 16a, the cells which is comprised the repeating unit do not include the incomplete cells at the outermost circumference.

In the honeycomb structure 100 shown in FIG. 1 to FIG. 5, the cells 2b formed on the outer side than the central cell structure 15 are configured to have the same shape, cell density and cell pitch. Therefore, the honeycomb structure body 4 of the honeycomb structure 100 shown in FIG. 1 to FIG. 5 comprises two types of cell structures, i.e., the central cell structure 15 and the circumferential cell structure 16 as the outermost circumferential cell structure 16a. It is to be noted that an example where the central cell structure 15 has a plurality of cell structures will be described later.

Figure 11:
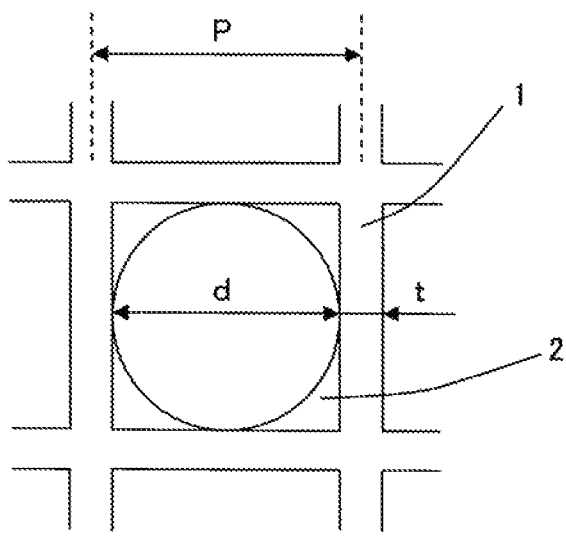
FIG. 11 is a schematic view to explain a cell pitch in a case where a cell shape is a square shape.

"The cell pitch of the outermost circumferential cell structure 16a" is a value which can be obtained by dividing a width of the repeating unit of the outermost circumferential cell structure 16a by the number of the cells which are present in a width direction of the repeating unit. Specifically, "the cell pitch of the outermost circumferential cell structure 16a" can be obtained as follows. As shown in FIG. 11, in a case where the shape of the cells 2 is a square shape, a length denoted with symbol P of FIG. 11 becomes "a cell pitch P". In FIG. 11, a length denoted with symbol d indicates a diameter of a circle inscribed in a square cell 2, and a length denoted with symbol t indicates a thickness of the partition walls 1 defining the cell 2. FIG. 11 is a schematic view to explain the cell pitch in the case where the cell shape is a square shape.

In a case of measuring the cell pitch P, the cell pitch is measured by the following method by use of a microscope. First, to a center of gravity of the circle inscribed in the square cell 2 which is the complete cell at the outermost circumference, distances of five or more continuous cells in "an extending direction of the cell pitch P" are measured in optional four directions, respectively. It is to be noted that a start point and an end point of this distance are centers of gravity of the cells. Then, the measured distance is divided by the number of the cells which are present in "the extending direction of the cell pitch P", to obtain "the cell pitch P" in one direction. In the measurement, the distances are measured in the four directions, and hence an average value of "the cell pitches P" obtained in the respective directions is defined as "the cell pitch P" of the cell structure of a measurement target.

Figure 12:
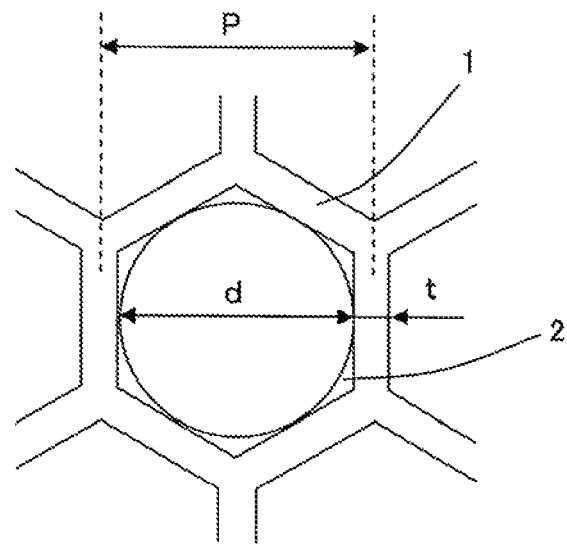
FIG. 12 is a schematic view to explain the cell pitch in a case where the cell shape is a hexagonal shape.

Furthermore, in a case where the shape of the cells 2 is a hexagonal shape as shown in FIG. 12, a length denoted with symbol P of FIG. 12 indicates "the cell pitch P". In FIG. 12, a length denoted with symbol d indicates a diameter of a circle inscribed in a hexagonal cell 2, and a length denoted with symbol t indicates a thickness of the partition walls 1 defining the cell 2. FIG. 12 is a schematic view to explain the cell pitch in the case where the cell shape is a hexagonal shape.

Figure 13:
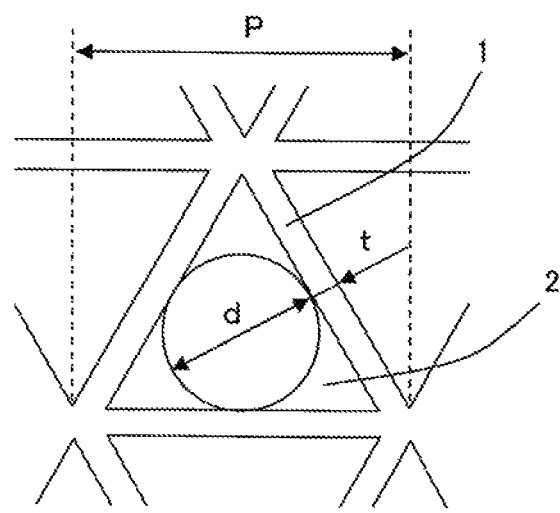
FIG. 13 is a schematic view to explain the cell pitch in a case where the cell shape is a triangular shape.

Furthermore, in a case where the shape of the cells 2 is a triangular shape as shown in FIG. 13, a length denoted with symbol P of FIG. 13 indicates "the cell pitch P". In FIG. 13, a length denoted with symbol d indicates a diameter of a circle inscribed in a triangular cell 2, and a length denoted with symbol t indicates a thickness of the partition walls 1 defining the cell 2. FIG. 13 is a schematic view to explain the cell pitch in the case where the cell shape is a triangular shape.

Furthermore, in a case where the repeating unit of the cell structure comprises two or more types of cells having different cell shapes, one set of the two or more types of cells is defined as one unit, and the cell pitch of the one unit is obtained by the above-mentioned method. Then, a value obtained by dividing the obtained cell pitch of the one unit by the number of the cells in the one unit is defined as "the cell pitch" of the cell structure of the measurement target.

For example, as to the cell structure which comprises cells whose cell shape is a quadrangular shape and cells whose cell shape is an octagonal shape, a pair of a quadrangular cell and an octagonal cell is defined as one unit. Then, by the above-mentioned method, the cell pitch of this one unit is obtained, and a value obtained by dividing the obtained cell pitch of the one unit by 2 is defined as "the cell pitch" of the cell structure.

A position of a geometric center of gravity O1 of the honeycomb structure body 4 can be obtained by imaging the inflow end face 11 or the outflow end face 12 of the honeycomb structure body 4 with an imaging device and performing an image analysis of the imaged image. In this case, the geometric center of gravity O1 of the honeycomb structure body 4 is defined as a center of gravity of a region surrounded with the circumferential wall 3 of the honeycomb structure body 4. In the image analysis of the imaged image, there is usable, for example, an image processing software of "WinROOF (trade name)" which is a two-dimensional image analysis software manufactured by MITANI CORPORATION.

A geometric center of gravity O2 of the central cell structure 15 can be obtained by imaging the inflow end face 11 or the outflow end face 12 of the honeycomb structure body 4 with an imaging device and performing an image analysis of the imaged image. In this case, when the boundary wall 8 (for example, see FIG. 7) defining a boundary between the central cell structure 15 and the circumferential cell structure 16 is not present in a boundary portion therebetween, the boundary between the central cell structure 15 and the circumferential cell structure 16 is defined as follows. First, the inflow end face 11 of the honeycomb structure body 4 is imaged with the imaging device, to obtain such an image as shown in FIG. 5. According to FIG. 5, in the central portion of the honeycomb structure body 4, the cells 2a whose cell shape is a quadrangular shape are the repeating units, and the cells 2a are uniformly arranged in a vertical direction and a horizontal direction of a paper surface of FIG. 5, which forms the central cell structure 15. Furthermore, according to FIG. 5, in the circumferential portion of the honeycomb structure body 4, square cells 2b whose cell shape is larger than that of the cells 2a of the central cell structure 15 are uniformly arranged in the vertical direction and the horizontal direction of the paper surface of FIG. 5. In the circumferential portion of the honeycomb structure body 4, the circumferential cell structure 16 comprises the larger quadrangular cells 2b. Furthermore, in the honeycomb structure 100 of the present embodiment, the boundary portion between the central cell structure 15 and the circumferential cell structure 16 of the honeycomb structure body 4 may comprise continuous or discontinuous partition walls 1. For example, according to FIG. 5, in the vicinity of the boundary between the central cell structure 15 and the circumferential cell structure 16, the cells 2a and the cells 2b are different in cell shapes, and there are present "intermediate cells" which cannot become a specific repeating unit. In such a case, the boundary between the central cell structure 15 and the circumferential cell structure 16 is defined by the following method.

Figure 6:
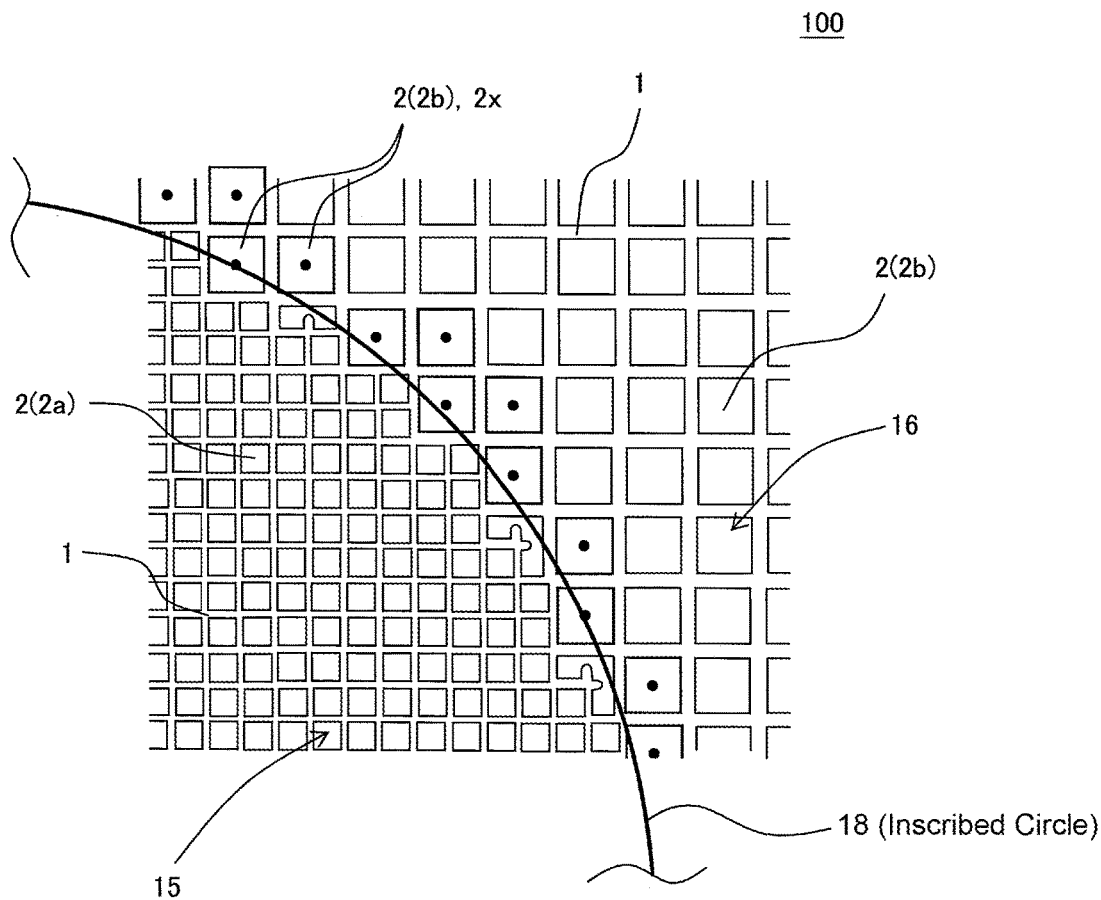
FIG. 6 is an enlarged plan view in which the range surrounded with the broken line denoted with the symbol Q of FIG. 4 is enlarged, to explain a measuring method of the geometric center of gravity of the central cell structure.

Here, FIG. 6 is an enlarged plan view in which the range surrounded with the broken line denoted with the symbol Q of FIG. 4 is enlarged, to explain a measuring method of the geometric center of gravity O2 of the central cell structure 15. In a case of defining the boundary between the central cell structure 15 and the circumferential cell structure 16, the boundary is defined by performing the image analysis of the image obtained by imaging the inflow end face 11 or the outflow end face 12 of the honeycomb structure body 4 with the imaging device. Specifically, as shown in FIG. 6, specific "cells 2b of the circumferential cell structure 16" are first extracted from the imaged image. The cells 2b of the circumferential cell structure 16 which are to be extracted are the cells 2b adjacent to the cells 2a of the central cell structure 15 via the partition walls 1, and the cells are the complete cells 2x which is comprised the repeating unit of the circumferential cell structure 16. That is, the cells 2b of the circumferential cell structure 16 to be extracted do not include the above-mentioned "intermediate cells".

Next, the respective centers of gravity of the extracted cells 2b of the circumferential cell structure 16 are obtained. In FIG. 6, the respective centers of gravity of the cells 2b of the circumferential cell structure 16 are indicated with black circles. Next, in the imaged image, the respective centers of gravity of the cells 2b of the circumferential cell structure 16 are connected by a straight line, and a maximum inscribed circle 18 is drawn to a shape obtained by connecting the centers by this straight line. A geometric center of gravity of the maximum inscribed circle 18 is defined as the geometric center of gravity O2 of the central cell structure 15. In such an image analysis, there is usable, for example, the image processing software of "WinROOF (trade name)" which is the two-dimensional image analysis software manufactured by MITANI CORPORATION. It is to be noted that in a case where the boundary wall 8 (see FIG. 7) defining the boundary between the central cell structure 15 and the circumferential cell structure 16 is present in the boundary portion therebetween as described later, a geometric center of gravity of a range surrounded with the boundary wall 8 (see FIG. 7) is defined as the geometric center of gravity O2 of the central cell structure 15. Hereinafter, in a case of simply mentioning "the center of gravity", the center of gravity means the geometric center of gravity unless otherwise specified.

The distance between the center of gravity O1 of the honeycomb structure body 4 and the center of gravity O2 of the central cell structure 15 can be also obtained by the above-mentioned image analysis.

In the honeycomb structure 100 of the present embodiment, it is preferable that the distance between the center of gravity O1 of the honeycomb structure body 4 and the center of gravity O2 of the central cell structure 15 is larger than a length of the cell pitch of the outermost circumferential cell structure 16a. Additionally, it is further preferable that the distance between the center of gravity O1 of the honeycomb structure body 4 and the center of gravity O2 of the central cell structure 15 is larger than twice of the length of the cell pitch of the outermost circumferential cell structure 16a. According to such a structure, the distance between the center of gravity O1 and the center of gravity O2 increases, and it is possible to more effectively inhibit deformation of the cells 2 formed on a circumferential side of the honeycomb structure 100. It is to be noted that there is not any special restriction on an upper limit of the distance between the center of gravity O1 and the center of gravity O2, and the distance can suitably be set in accordance with a size of a circumference of the honeycomb structure 100 or the length of the cell pitch of the outermost circumferential cell structure 16a. An example of the upper limit of the distance between the center of gravity O1 and the center of gravity O2 is five times or less of the cell pitch of the outermost circumferential cell structure 16a.

There is not any special restriction on each cell shape in the plane perpendicular to the cell extending direction. Examples of the shape of cells included in the central cell structure and the circumferential cell structure include a polygonal shape such as a triangular shape, a quadrangular shape, a hexagonal shape and an octagonal shape. Furthermore, as to the cells included in the central cell structure and the circumferential cell structure, a shape of one cell may be different from that of another cell in each cell structure.

In the honeycomb structure of the present embodiment, it is preferable that a cell density of the central cell structure is larger than a cell density of the outermost circumferential cell structure. This honeycomb structure is preferable in that flow of an exhaust gas to the central portion is inhibited, the exhaust gas easily flows to the circumferential portion, and eventually a purification performance of the honeycomb structure can improve.

The cell density in the central cell structure is preferably from 30 to 150 cells/cm$^2$, further preferably from 50 to 130 cells/cm$^2$, and especially preferably from 80 to 100 cells/cm$^2$. When the cell density in the central cell structure is smaller than 30 cells/cm$^2$, the purification performance might be insufficient. On the other hand, when the cell density in the central cell structure is in excess of 150 cells/cm$^2$, a pressure loss of the honeycomb structure might increase, and in a case where a catalyst is loaded onto the honeycomb structure, clogging of the cells might occur due to the loaded catalyst.

The cell density in the outermost circumferential cell structure is preferably from 20 to 130 cells/cm$^2$, further preferably from 25 to 100 cells/cm$^2$, and especially preferably from 30 to 80 cells/cm$^2$. When the cell density in the outermost circumferential cell structure is smaller than 20 cells/cm$^2$, a strength of the honeycomb structure might run short. On the other hand, when the cell density in the outermost circumferential cell structure is in excess of 130 cells/cm$^2$, the pressure loss of the honeycomb structure might increase, and in the case where the catalyst is loaded, the clogging of the cells might occur due to the loaded catalyst. Additionally, it is preferable that a cell density in the circumferential cell structure falls in the above-mentioned numeric range of the cell density in the outermost circumferential cell structure.

A thickness of the partition walls in the central cell structure is preferably from 0.04 to 0.31 mm, further preferably from 0.05 to 0.25 mm, and especially preferably from 0.06 to 0.20 mm. If the thickness of the partition walls in the central cell structure is too thin, it is not preferable in a point in which the strength of the honeycomb structure is reduced. If the thickness of the partition walls in the central cell structure is too thick, it is not preferable in points in which a pressure loss is increased.

A thickness of the partition walls in the outermost circumferential cell structure is preferably from 0.05 to 0.38 mm, further preferably from 0.07 to 0.30 mm, and especially preferably from 0.09 to 0.21 mm. If the thickness of the partition walls in the outermost circumferential cell structure is too thin, it is not preferable in a point in which the strength of the honeycomb structure is reduced. If the thickness of the partition walls in the outermost circumferential cell structure is too thick, it is not preferable in points in which a pressure loss is increased. Additionally, it is preferable that a thickness of the partition walls in the circumferential cell structure falls in the above-mentioned numeric range of the thickness of the partition walls in the outermost circumferential cell structure.

A porosity of the partition walls of the honeycomb structure body is preferably from 3 to 75%, further preferably from 25 to 65%, and especially preferably from 30 to 60%. If the porosity of the partition walls is smaller than 3%, it might be difficult to perform coating with the catalyst, and the pressure loss might increase in a case of using the honeycomb structure as a filter. If the porosity of the partition walls is in excess of 75%, the strength of the honeycomb structure 100 might be insufficient, and it is difficult to hold the honeycomb structure with a sufficient holding force, in a case of canning the honeycomb structure in a can member for use in an exhaust gas purification device. The porosity of the partition walls is a value measured with a mercury porosimeter. An example of the mercury porosimeter includes Autopore 9500 (trade name) manufactured by Micromeritics.

As to a material of the partition walls from the viewpoints of a strength, a heat resistance, a durability and the like, it is preferable that a main component is any type of ceramic, metal or the like of an oxide or a nonoxide. Specifically, it is preferable that an example of ceramics is a material including at least one selected from the group consisting of cordierite, mullite, alumina, spinel, silicon carbide, silicon nitride and aluminum titanate. It is considered that an example of the metal is a Fe—Cr—Al-based metal or a metal silicon. It is preferable to include, as the main component, at least one selected from the group consisting of these materials. From the viewpoints of a high strength, a high heat resistance and the like, it is more preferable to include, as the main component, at least one selected from the group consisting of materials such as alumina, mullite, aluminum titanate, cordierite, silicon carbide and silicon nitride. Among these materials, cordierite, aluminum titanate, silicon carbide, metal silicon-bonding silicon carbide and a composite material of cordierite and silicon carbide are especially preferable. Furthermore, from the viewpoint of a high thermal conductivity, a high heat resistance or the like, silicon carbide or a silicon-silicon carbide composite material is especially suitable. Here, "the main component" means a component which is present among components as much as 50 mass % or more, preferably 70 mass % or more, and further preferably 80 mass % or more.

There is not any special restriction on the whole shape of the honeycomb structure. In the whole shape of the honeycomb structure of the present embodiment, a shape of the inflow end face and the outflow end face is preferably a round shape or an elliptic shape, and especially preferably a round shape. Furthermore, there is not any special restriction on a size of the honeycomb structure, but it is preferable that a length from the inflow end face to the outflow end face is from 20 to 400 mm. Furthermore, in a case where the whole shape of the honeycomb structure is a round pillar shape, it is preferable that a diameter of each end face is from 60 to 300 mm.

In the plane perpendicular to the cell extending direction of the honeycomb structure body, there is not any special restriction on a size of the central cell structure. However, it is preferable that a size of a diameter of the central cell structure in the plane is from 0.3 to 0.8 times to a diameter of the plane perpendicular to the cell extending direction of the honeycomb structure body. Furthermore, in a case where the central cell structure comprises a plurality of cell structures, it is preferable that a size of a diameter of the central cell structure which is present closest to the circumference is in the above numeric range in the plane perpendicular to the cell extending direction.

The honeycomb structure of the present embodiment can be suitably used as an exhaust gas purifying member of an internal combustion engine. For example, the honeycomb structure can be suitably utilized as a catalyst carrier onto which an exhaust gas purifying catalyst is loaded. In the honeycomb structure of the present embodiment, the exhaust gas purifying catalyst may be loaded onto at least one of each surface of the partition walls of the honeycomb structure body and each pore of the partition walls.

Furthermore, the honeycomb structure of the present embodiment may further include a plugging portion disposed in one of end portions of each cell defined by the partition walls. That is, the plugging portions are disposed in open ends of the cells on an inflow end face side or an outflow end face side, to plug one of the end portions of each cell, and such a honeycomb structure can be utilized as a filter to remove particulate matter in the exhaust gas.

Figure 7:
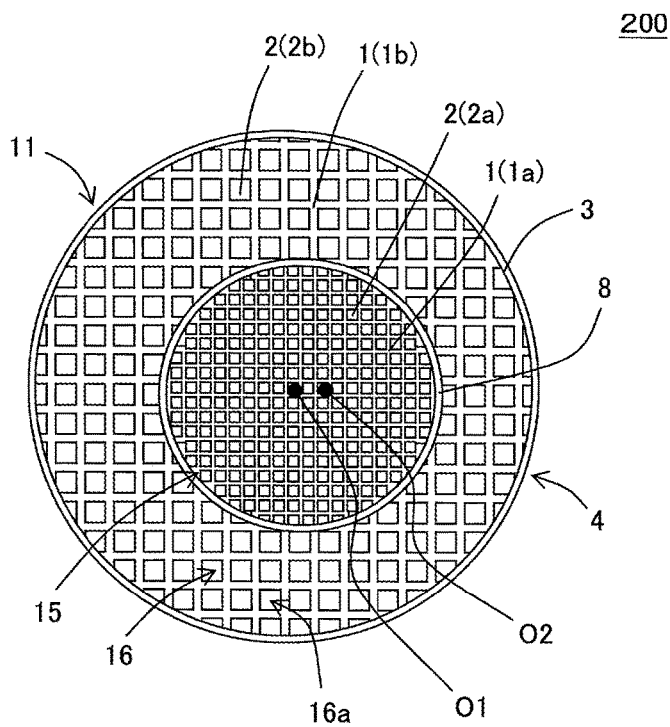
FIG. 7 is a plan view schematically showing an inflow end face of a honeycomb structure according to another embodiment of the present invention.

Next, a honeycomb structure according to another embodiment of the present invention will be described with reference to FIG. 7. FIG. 7 is a plan view schematically showing an inflow end face of a honeycomb structure according to another embodiment of the present invention. As shown in FIG. 7, a honeycomb structure 200 of the present embodiment includes a pillar-shaped honeycomb structure body 4 having porous partition walls 1. In a plane perpendicular to an extending direction of cells 2, the honeycomb structure body 4 has a central cell structure 15 and a circumferential cell structure 16, and the cell structure of the central cell structure 15 differs from the cell structure of the circumferential cell structure 16. Furthermore, similarly to the honeycomb structure 100 shown in FIG. 1 to FIG. 5, a center of gravity O1 of the honeycomb structure body 4 is present at a position which is away from a center of gravity O2 of the central cell structure 15 in the above plane. Furthermore, a distance between the respective centers of gravity, i.e., a distance between the center of gravity O1 and the center of gravity O2 is larger than a length of a half of a cell pitch of an outermost circumferential cell structure 16a.

In the honeycomb structure 200 shown in FIG. 7, the honeycomb structure body 4 has a porous boundary wall 8 in a boundary portion between the central cell structure 15 and the circumferential cell structure 16. Therefore, in the honeycomb structure 200, a region which is arranged at an inner side with respect to the boundary wall 8 becomes the central cell structure 15. As to cells 2a formed in the central cell structure 15, one cell or any combination of a plurality of cells becomes one repeating unit, and the central cell structure 15 includes a set of repeating units.

The boundary wall 8 may include the same material as the partition walls 1 or a different material from that of the partition walls, the same material as in the partition walls 1 is preferable. There is not any special restriction on a shape of the boundary wall 8 as long as the boundary wall may define the boundary portion between the central cell structure 15 and the circumferential cell structure 16. Examples of the shape of the boundary wall 8 include a round shape, an elliptic shape, and a polygonal shape. An example of the shape of the boundary wall 8 includes a shape analogous to a circumferential wall 3 of the honeycomb structure body 4, or a shape obtained by changing a length of the analogous shape in one axial direction. There is not any special restriction on a thickness of the boundary wall 8, the thickness of the boundary wall 8 is, for example, preferably from 0.5 to 3.0 times of a thickness of the partition walls 1 of the circumferential cell structure 16, and more preferably from 0.8 to 2.0 times of the thickness.

In the honeycomb structure 200 of the present embodiment, it is possible to employ a structure similar to the honeycomb structure 100 shown in FIG. 1 to FIG. 5 except that the honeycomb structure body 4 has the porous boundary wall 8 in the boundary portion between the central cell structure 15 and the circumferential cell structure 16.

Figure 8:
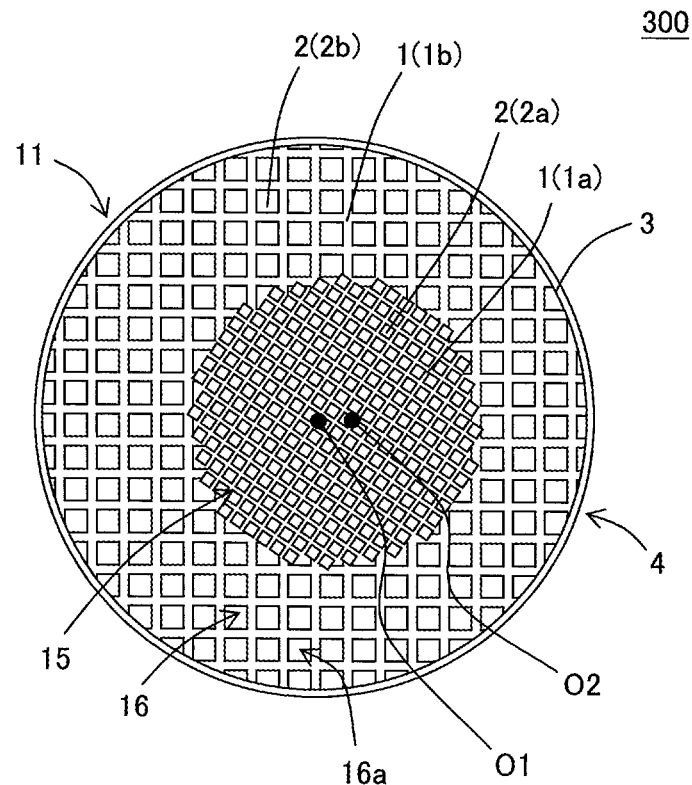
FIG. 8 is a plan view schematically showing an inflow end face of a honeycomb structure according to still another embodiment of the present invention.

Next, a honeycomb structure according to still another embodiment of the present invention will be described with reference to FIG. 8. FIG. 8 is a plan view schematically showing an inflow end face of the honeycomb structure according to still another embodiment of the present invention. As shown in FIG. 8, a honeycomb structure 300 of the present embodiment includes a pillar-shaped honeycomb structure body 4 having porous partition walls 1. In a plane perpendicular to an extending direction of cells 2, the honeycomb structure body 4 has a central cell structure 15 and a circumferential cell structure 16, and the cell structure of the central cell structure 15 differs from the cell structure of the circumferential cell structure 16. Furthermore, similarly to the honeycomb structure 100 shown in FIG. 1 to FIG. 5, a center of gravity O1 of the honeycomb structure body 4 is present at a position which is away from a center of gravity O2 of the central cell structure 15 in the above plane. Furthermore, a distance between the respective centers of gravity, i.e., a distance between the center of gravity O1 and the center of gravity O2 is larger than a length of a half of a cell pitch of an outermost circumferential cell structure 16a.

In the honeycomb structure 300 shown in FIG. 8, an arrangement direction of repeating units of cells 2a in the central cell structure 15 is tilted to an arrangement direction of repeating units of cells 2b in the outermost circumferential cell structure 16a. That is, the repeating units of the cells 2b in the outermost circumferential cell structure 16a are arranged in a horizontal direction of a paper surface of FIG. 8, whereas the repeating units of the cells 2a in the central cell structure 15 are arranged in a direction obliquely tilted to the horizontal direction of the paper surface of FIG. 8. For example, it can be considered that in the honeycomb structure 300 shown in FIG. 8, the central cell structure 15 is disposed in a rotated state as much as about 45° in a clockwise direction around the center of gravity O2 in the honeycomb structure 100 shown in FIG. 1 to FIG. 5.

In the honeycomb structure 300 shown in FIG. 8, there is not any special restriction on a size of an angle formed by the arrangement direction of the repeating units of the cells 2b in the outermost circumferential cell structure 16a and the arrangement direction of the repeating units of the cells 2a in the central cell structure 15. For example, in a case where a cell shape of all complete cells is a quadrangular shape, the arrangement direction of the repeating units of the cells 2a in the central cell structure 15 may tilt as much as 10° or more and 45° or less to the arrangement direction of the repeating units of the cells 2b in the outermost circumferential cell structure 16a. Furthermore, in a case where a cell shape of complete cells of the cells 2a and the cells 2b is a quadrangular shape, it is preferable that an angle formed by the arrangement direction of the repeating units of the cells 2b in the outermost circumferential cell structure 16a and the arrangement direction of the repeating units of the cells 2a in the central cell structure 15 is 45°±15°. On the other hand, in a case where the cell shape of the complete cells of the cells 2a and the cells 2b is a hexagonal shape, it is preferable that the angle formed by the arrangement direction of the repeating units of the cells 2b in the outermost circumferential cell structure 16a and the arrangement direction of the repeating units of the cells 2a in the central cell structure 15 is 30°±10°. According to this structure, an effect of preventing deformation of the cells is further exhibited.

Figure 9:
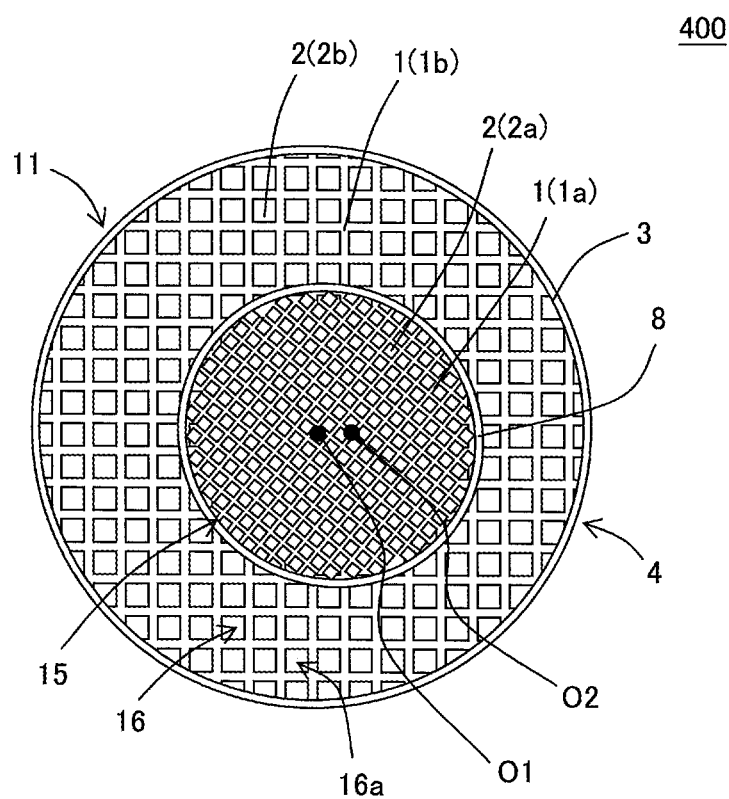
FIG. 9 is a plan view schematically showing an inflow end face of a honeycomb structure according to still another embodiment of the present invention.

Next, a honeycomb structure according to still another embodiment of the present invention will be described with reference to FIG. 9. FIG. 9 is a plan view schematically showing an inflow end face of the honeycomb structure according to still another embodiment of the present invention. As shown in FIG. 9, a honeycomb structure 400 of the present embodiment includes a pillar-shaped honeycomb structure body 4 having porous partition walls 1. In a plane perpendicular to an extending direction of cells 2, the honeycomb structure body 4 has a central cell structure 15 and a circumferential cell structure 16, and the cell structure of the central cell structure 15 differs from the cell structure of the circumferential cell structure 16. Furthermore, similarly to the honeycomb structure 100 shown in FIG. 1 to FIG. 5, a center of gravity O1 of the honeycomb structure body 4 is present at a position which is away from a center of gravity O2 of the central cell structure 15 in the above plane. Furthermore, a distance between the respective centers of gravity, i.e., a distance between the center of gravity O1 and the center of gravity O2 is larger than a length of a half of a cell pitch of an outermost circumferential cell structure 16a.

In the honeycomb structure 400 shown in FIG. 9, the honeycomb structure body 4 has a porous boundary wall 8 in a boundary portion between the central cell structure 15 and the circumferential cell structure 16. Furthermore, in the honeycomb structure 400 shown in FIG. 9, an arrangement direction of repeating units of cells 2a in the central cell structure 15 is tilted to an arrangement direction of repeating units of cells 2b in the outermost circumferential cell structure 16a.

In the honeycomb structure 300 shown in FIG. 8 and the honeycomb structure 400 shown in FIG. 9, it is possible to employ a structure similar to the honeycomb structure 100 shown in FIG. 1 to FIG. 5 except that the honeycomb structures are configured as described above.

Figure 10:
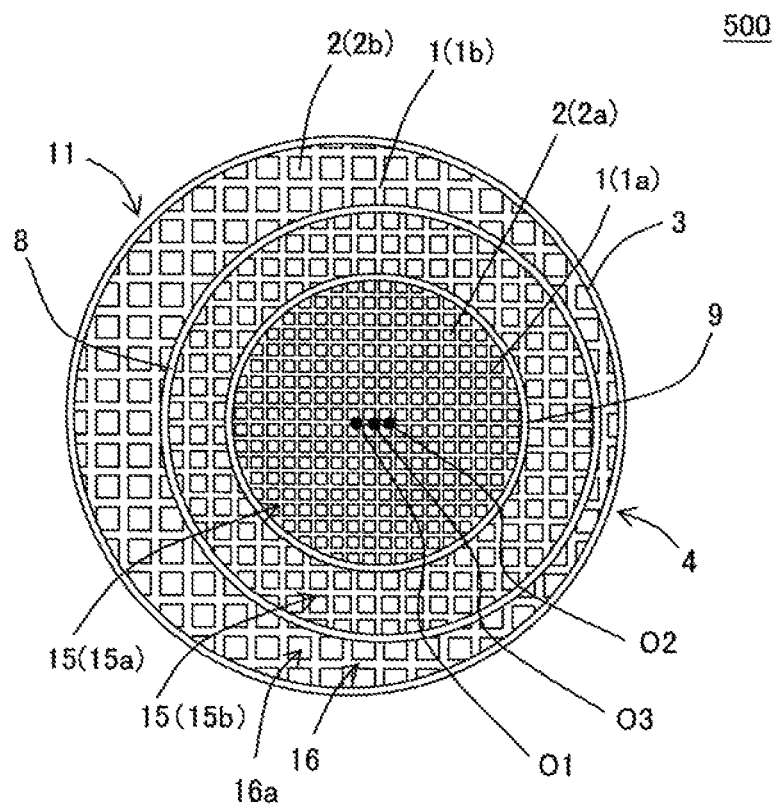
FIG. 10 is a plan view schematically showing an inflow end face of a honeycomb structure according to still another embodiment of the present invention.

Next, a honeycomb structure according to still another embodiment of the present invention will be described with reference to FIG. 10. FIG. 10 is a plan view schematically showing an inflow end face of the honeycomb structure according to still another embodiment of the present invention. In the honeycomb structure of the present embodiment, a central cell structure which is arranged at an inner side with respect to a circumferential cell structure includes two or more cell structures. That is, as shown in FIG. 10, a honeycomb structure 500 of the present embodiment includes a pillar-shaped honeycomb structure body 4 having porous partition walls 1. In a plane perpendicular to an extending direction of cells 2, the honeycomb structure body 4 has a central cell structure 15 and a circumferential cell structure 16, and the cell structure of the central cell structure 15 differs from the cell structure of the circumferential cell structure 16.

In the honeycomb structure 500 shown in FIG. 10, the central cell structure 15 includes two cell structures. That is, in the honeycomb structure 500, the central cell structure 15 has a first central cell structure 15a which exists toward inside than the honeycomb structure body 4, and a second central cell structure 15b which exists to surround the first central cell structure 15a. Furthermore, a center of gravity O2 of the first central cell structure 15a and a center of gravity O3 of the second central cell structure 15b exist at positions which are away from a center of gravity O1 of the honeycomb structure body 4, respectively. In the honeycomb structure 500, at least one of a distance between the center of gravity O1 and the center of gravity O2 and a distance between the center of gravity O1 and the center of gravity O3 is larger than a length of a half of a cell pitch of an outermost circumferential cell structure 16a. In a case where the central cell structure 15 includes two or more cell structures as in the honeycomb structure 500 of the present embodiment, the respective centers of gravity of the cell structures exist at the positions which are away from the center of gravity O1 of the honeycomb structure body 4.

In the honeycomb structure 500 shown in FIG. 10, a boundary portion between the first central cell structure 15a and the second central cell structure 15b has a boundary wall 9 defining a boundary therebetween. It is to be noted that the boundary portion between the first central cell structure 15a and the second central cell structure 15b does not have the boundary wall 9 but may include continuous or discontinuous partition walls 1.

In the honeycomb structure 500, the distance between the center of gravity O1 and the center of gravity O2 is preferably larger than the length of the half of the cell pitch of the outermost circumferential cell structure 16a, more preferably larger than a length of the cell pitch of the outermost circumferential cell structure 16a, and especially preferably larger than twice of the length of the cell pitch of the outermost circumferential cell structure 16a. Furthermore, the distance between the center of gravity O1 and the center of gravity O3 is preferably larger than the length of the half of the cell pitch of the outermost circumferential cell structure 16a, more preferably larger than the length of the cell pitch of the outermost circumferential cell structure 16a, and especially preferably larger than twice of the length of the cell pitch of the outermost circumferential cell structure 16a.

As to the center of gravity O3 of the second central cell structure 15b, its position can be specified in conformity with a method of specifying the position of the center of gravity O2 of the central cell structure 15 which has been described with reference to FIG. 6. As to the center of gravity O2 of the first central cell structure 15a, the circumferential cell structure 16 in the method of specifying the position of the center of gravity O2 of the central cell structure 15 which has been described with reference to FIG. 6 can be regarded as the second central cell structure 15b, and the position of the center of gravity can be specified by a method similar to the above-mentioned method.

Furthermore, in the honeycomb structure 500 shown in FIG. 10, there has been described an example where three points of the center of gravity O1, the center of gravity O2 and the center of gravity O3 are arranged on the same straight line. However, in the case where the central cell structure 15 includes the first central cell structure 15a and the second central cell structure 15b, a straight line connecting the center of gravity O1 and the center of gravity O2 and a straight line connecting the center of gravity O1 and the center of gravity O3 may have a positional relation to cross each other.

(2) Manufacturing Method of Honeycomb Structure:

Next, a method of manufacturing the honeycomb structure of the present invention will be described.

First, a kneaded material having plasticity is prepared to obtain a honeycomb structure body. The kneaded material to prepare the honeycomb structure body can be prepared by suitably adding an additive such as a binder and water to raw material powder of a material selected from the group consisting of the above-mentioned suitable materials of the partition walls.

Next, by means of the extrusion of the prepared kneaded material, a pillar-shaped honeycomb formed body having the partition walls which defines a plurality of the cells and the circumferential wall arranged at the outermost circumference is obtained. In the extrusion, as a die for the extrusion, a configuration in which a slit having a reversed shape of the honeycomb formed body to be formed is formed on an extrusion surface of the kneaded material can be used. Especially, when the honeycomb structure according to the present invention is manufactured, as the die for the extrusion, it is preferable to use a configuration in which a slit is formed such that the cell structures in the central portion and the circumferential portion of the honeycomb formed body to be formed by the extrusion are different to each other.

The obtained honeycomb formed body may be dried with, for example, microwaves and hot air. Then, open ends of cells may be plugged with a material similar to the material used in manufacturing the honeycomb formed body, to arrange plugging portions.

Next, the obtained honeycomb formed body is fired, thereby to obtain the honeycomb structure. A firing temperature and a firing atmosphere vary in accordance with a raw material, and any person skilled in the art can select the firing temperature and the firing atmosphere which are optimum for the selected material. It is to be noted that the method of manufacturing the honeycomb structure of the present invention is not limited to the hitherto described method.

EXAMPLES

Example 1

To 100 parts by mass of a cordierite forming raw material, 35 parts by mass of a dispersing medium, 6 parts by mass of an organic binder and 0.5 parts by mass of a dispersing agent were added, respectively, followed by mixing and kneading, to prepare a kneaded material. As the cordierite forming raw material, alumina, aluminum hydroxide, kaolin, talc and silica were used. As the dispersing medium, water was used, as a pore former, cokes having an average particle diameter of 1 to 10 μm were used, as the organic binder, hydroxypropylmethylcellulose was used, and as the dispersing agent, ethylene glycol was used.

Next, the kneaded material was extruded by using a honeycomb formed body preparing die, to obtain a honeycomb formed body in which the whole shape was a round pillar shape. In the extrusion, the extruding die was used in which slits were formed so that a cell structure of a central portion of the honeycomb formed body to be extruded differed from a cell structure of a circumferential portion thereof.

Next, the honeycomb formed body was dried with a microwave drier and further completely dried with a hot air drier, and then both end faces of the honeycomb formed body were cut to adjust the honeycomb formed body into a predetermined dimension.

Next, the dried honeycomb formed body was degreased and fired, thereby to manufacture a honeycomb structure of Example 1. The honeycomb structure of Example 1 had a round pillar shape in which a diameter of each end face was 118 mm. A length of the honeycomb structure of Example 1 in a cell extending direction was 84 mm.

Furthermore, in the honeycomb structure of Example 1, a cell structure of a circumferential cell structure differed from a cell structure of a central cell structure in a plane perpendicular to the cell extending direction. The central cell structure had one type of cell structure, and the honeycomb structure of Example 1 had two types of cell structures in total, i.e., the circumferential cell structure and the central cell structure. As to a honeycomb structure having two types of cell structures in total as in the honeycomb structure of Example 1, Table 1 shows "2" in a column of "a type of cell structure". For example, in a case where the central cell structure includes two types of cell structures and the honeycomb structure has the circumferential cell structure and the central cell structures, i.e., three types of cell structure in total, Table 1 shows "3" in the column of "the type of cell structure". Furthermore, in a case where there is one type of central cell structure in the present example, the central cell structure will be referred to as "a first central cell structure" sometimes. On the other hand, in a case where there are two types of central cell structures in the present example, the central cell structure on a further inner side will be referred to as "the first central cell structure" sometimes and the central cell structure on an outer side than the first central cell structure will be referred to as "a second central cell structure" sometimes.

Furthermore, the obtained honeycomb structure had a boundary wall in a boundary portion between the circumferential cell structure and the central cell structure. As to a honeycomb structure having a boundary wall in a boundary portion between a circumferential cell structure and a central cell structure as in the honeycomb structure of Example 1, Table 1 shows "present" in a column of "presence/absence of the boundary wall". On the other hand, as to a honeycomb structure which does not have a boundary wall in a boundary portion between a circumferential cell structure and a central cell structure, Table 1 shows "none" in the column of "the presence/absence of the boundary wall".

In the central cell structure of the honeycomb structure of Example 1, a thickness of partition walls was 0.102 mm, a cell density was 93.0 cells/cm$^2$, and a cell shape was a quadrangular shape. Furthermore, in the circumferential cell structure of the honeycomb structure of Example 1, a thickness of partition walls was 0.102 mm, a cell density was 62.0 cells/cm$^2$, and a cell shape was a quadrangular shape. Table 1 shows the thicknesses of partition walls, cell densities and cell shapes of the central cell structure and the circumferential cell structure in a column of "the cell structure".

Furthermore, the central cell structure of the honeycomb structure of Example 1 was round shape in each end face of a honeycomb structure body, and its diameter was 60 mm.

Furthermore, in the honeycomb structure of Example 1, a position of a geometric center of gravity O1 of the honeycomb structure body was present at a position which was away from a position of a geometric center of gravity O2 of the central cell structure. An image of an inflow end face of the honeycomb structure was analyzed, the position of the geometric center of gravity O1 of the honeycomb structure body and the position of the geometric center of gravity O2 of the central cell structure were obtained, and a distance between the center of gravity O1 and the center of gravity O2 was measured. The positions of the center of gravity O1 and the center of gravity O2 were specified and the distance between the center of gravity O1 and the center of gravity O2 was measured by an image processing software of "WinROOF (tradename)" of a two-dimensional image analysis software manufactured by MITANI CORPORATION. Table 2 shows "the distance between the center of gravity O1 and the center of gravity O2" in a column of "the distance between the centers of gravity in the honeycomb structure body". Table 2 shows the distance between the center of gravity O1 of the honeycomb structure body and the center of gravity O2 of the first central cell structure in a column of "A: the first central cell structure (mm)".

Furthermore, Table 2 shows the distance between the center of gravity O1 of the honeycomb structure body and the center of gravity O3 of the second central cell structure in a column of "B: the second central cell structure (mm)".

Furthermore, as to the honeycomb structure of Example 1, a cell pitch of an outermost circumferential cell structure was measured. The cell pitch of the outermost circumferential cell structure was measured as follows by using a microscope. First, to a center of gravity of a circle inscribed in a complete cell at an outermost circumference, distances of five continuous cells in "an extending direction of the cell pitch" were measured in optional four directions, respectively. Additionally, a start point and an end point of this distance were defined as centers of gravity of the cells. Then, each of the respective measured distances in the four directions was divided by the number "5" of the continuous cells, and an average value of the respective distances was obtained as "the cell pitch of the outermost circumferential cell structure". Table 2 shows a value of the cell pitch obtained in this manner in a column of "C: the cell pitch of the outermost circumferential cell structure".

Table 2 shows, in a column of "A/C", a value obtained by dividing the distance between the center of gravity O1 of the honeycomb structure body and the center of gravity O2 of the first central cell structure (i.e., the numeric value in the column of "A: the first central cell structure (mm)" of Table 2) by the cell pitch of the outermost circumferential cell structure. Furthermore, Table 2 shows, in a column of "B/C", a value obtained by dividing the distance between the center of gravity O1 of the honeycomb structure body and the center of gravity O3 of the second central cell structure (i.e., the numeric value in the column of "B: the second central cell structure (mm)" of Table 2) by the cell pitch of the outermost circumferential cell structure.

In the honeycomb structure of Example 1, an angle formed by an arrangement direction of repeating units of the cells in the outermost circumferential cell structure and an arrangement direction of repeating units of the cells in the central cell structure was 0°. Table 2 shows a size of the above-mentioned angle formed by two arrangement directions in a column of "a tilt (°) of the cell arrangement of the first central cell structure".

In the honeycomb structure of Example 1, a porosity of the partition walls was 35%. The porosity of the partition walls was a value measured with Autopore 9500 (trade name) manufactured by Micromeritics. Table 2 shows a value of the porosity of the partition walls in a column of "the porosity (%) of the partition walls".

Furthermore, as to the honeycomb structure of Example 1, "isostatic strength evaluation" was performed by the following method. Table 2 shows the evaluation result in a column of "strength evaluation (relative evaluation)".

Isostatic Strength Evaluation

An isostatic strength was measured on the basis of an isostatic breakdown strength test stipulated in a car standard (JASO Standard) M505-87 issued by the society of Automotive Engineers of Japan. The isostatic breakdown strength test is a test of placing the honeycomb structure in a tubular container of rubber and closing the container with a lid made of an aluminum plate to perform an isotropic pressurizing compression in water. That is, the isostatic breakdown strength test is a test which simulates a compressive load application in a case of holding a circumferential surface of the honeycomb structure in a can member. The isostatic strength measured by this isostatic breakdown strength test is indicated by an adding pressure value (MPa) when the honeycomb structure breaks. Hereinafter, the isostatic strength will be referred to as "the ISO strength" sometimes. In the isostatic strength evaluation of the present example, relative evaluation was performed by comparing an adding pressure value (MPa) of the honeycomb structure of each of Comparative Examples 1, 7 and 11 of standards with an adding pressure value (MPa) of the honeycomb structure of an evaluation target. Additionally, in Examples 1 to 25 and Comparative Examples 2 to 6, Comparative Example 1 was used as the standard. In Examples 26 to 43 and Comparative Examples 8 to 10, Comparative Example 7 was used as the standard. In Examples 44 to 53 and Comparative Examples 12 to 14, Comparative Example 11 was used as the standard. Judgment standards of the evaluation are as follows.

Evaluation A: In a case where a decrease ratio of the ISO strength is 10% or less of the standard, the evaluation is "excellent".

Evaluation B: In a case where the decrease ratio of the ISO strength is larger than 10% and 30% or less of the standard, the evaluation is "good".

Evaluation C: In a case where the decrease ratio of the ISO strength is larger than 30% of the standard, the evaluation is "failure".

TABLE 1

| | | | Cell structure | | | | | | | | |
|---|---|---|---|---|---|---|---|---|---|---|---|
| | | | First central cell structure | | | Second central cell structure | | | Circumferential cell structure | | |
| | Type of cell structure (type) | Presence/ absence of boundary wall | Thickness of partition walls (mm) | Cell density (cells/cm$^2$) | Cell shape | Thickness of partition walls (mm) | Cell density (cells/cm$^2$) | Cell shape | Thickness of partition walls (mm) | Cell density (cells/cm$^2$) | Cell shape |
| Comparative Example 1 | 1 | — | — | — | — | — | — | — | 0.102 | 62.0 | Quadrangular |
| Comparative Example 2 | 2 | Present | 0.102 | 93.0 | Quadrangular | — | — | — | 0.102 | 62.0 | Quadrangular |
| Example 1 | 2 | Present | 0.102 | 93.0 | Quadrangular | — | — | — | 0.102 | 62.0 | Quadrangular |
| Example 2 | 2 | Present | 0.102 | 93.0 | Quadrangular | — | — | — | 0.102 | 62.0 | Quadrangular |
| Example 3 | 2 | Present | 0.102 | 93.0 | Quadrangular | — | — | — | 0.102 | 62.0 | Quadrangular |
| Example 4 | 2 | Present | 0.102 | 93.0 | Quadrangular | — | — | — | 0.102 | 62.0 | Quadrangular |
| Example 5 | 2 | Present | 0.102 | 93.0 | Quadrangular | — | — | — | 0.102 | 62.0 | Quadrangular |
| Example 6 | 2 | Present | 0.102 | 93.0 | Quadrangular | — | — | — | 0.102 | 62.0 | Quadrangular |
| Comparative Example 3 | 3 | Present | 0.102 | 93.0 | Quadrangular | 0.076 | 116.25 | Quadrangular | 0.102 | 62.0 | Quadrangular |
| Comparative Example 4 | 3 | Present | 0.102 | 93.0 | Quadrangular | 0.076 | 116.25 | Quadrangular | 0.102 | 62.0 | Quadrangular |
| Example 7 | 3 | Present | 0.102 | 93.0 | Quadrangular | 0.076 | 116.25 | Quadrangular | 0.102 | 62.0 | Quadrangular |
| Example 8 | 3 | Present | 0.102 | 93.0 | Quadrangular | 0.076 | 116.25 | Quadrangular | 0.102 | 62.0 | Quadrangular |
| Example 9 | 2 | Present | 0.102 | 93.0 | Quadrangular | — | — | — | 0.102 | 62.0 | Quadrangular |
| Example 10 | 2 | Present | 0.102 | 93.0 | Quadrangular | — | — | — | 0.102 | 62.0 | Quadrangular |
| Comparative Example 5 | 2 | Present | 0.102 | 93.0 | Quadrangular | — | — | — | 0.102 | 62.0 | Quadrangular |
| Example 11 | 2 | Present | 0.102 | 93.0 | Quadrangular | — | — | — | 0.102 | 62.0 | Quadrangular |
| Example 12 | 2 | Present | 0.102 | 93.0 | Quadrangular | — | — | — | 0.102 | 62.0 | Quadrangular |
| Example 13 | 2 | Present | 0.102 | 93.0 | Quadrangular | — | — | — | 0.102 | 62.0 | Quadrangular |
| Example 14 | 2 | Present | 0.102 | 93.0 | Quadrangular | — | — | — | 0.102 | 62.0 | Quadrangular |
| Example 15 | 3 | Present | 0.102 | 93.0 | Quadrangular | 0.076 | 116.25 | Quadrangular | 0.102 | 62.0 | Quadrangular |
| Comparative Example 6 | 2 | None | 0.102 | 93.0 | Quadrangular | — | — | — | 0.102 | 62.0 | Quadrangular |
| Example 16 | 2 | None | 0.102 | 93.0 | Quadrangular | — | — | — | 0.102 | 62.0 | Quadrangular |
| Example 17 | 2 | None | 0.102 | 93.0 | Quadrangular | — | — | — | 0.102 | 62.0 | Quadrangular |
| Example 18 | 3 | None | 0.102 | 93.0 | Quadrangular | 0.076 | 116.25 | Quadrangular | 0.102 | 62.0 | Quadrangular |
| Example 19 | 2 | Present | 0.102 | 93.0 | Hexagonal | — | — | — | 0.102 | 62.0 | Quadrangular |
| Example 20 | 2 | Present | 0.102 | 93.0 | Hexagonal | — | — | — | 0.102 | 62.0 | Quadrangular |
| Example 21 | 2 | Present | 0.102 | 93.0 | Hexagonal | — | — | — | 0.102 | 62.0 | Quadrangular |
| Example 22 | 2 | Present | 0.076 | 93.0 | Quadrangular | — | — | — | 0.102 | 62.0 | Quadrangular |
| Example 23 | 2 | Present | 0.051 | 139.5 | Quadrangular | — | — | — | 0.102 | 62.0 | Quadrangular |
| Example 24 | 2 | Present | 0.089 | 116.3 | Quadrangular | — | — | — | 0.102 | 62.0 | Quadrangular |
| Example 25 | 2 | Present | 0.127 | 46.5 | Quadrangular | — | — | — | 0.102 | 62.0 | Quadrangular |

TABLE 2

| | Distance between centers of gravity in honeycomb structure body | | C: cell pitch of outermost circumferential cell structure (mm) | A/C | B/C | Tilt of cell arrangement of first central cell structure (°) | Tilt of cell arrangement of second central cell structure (°) | Porosity of partition walls (%) | Strength evaluation (relative evaluation) |
|---|---|---|---|---|---|---|---|---|---|
| | A: first central cell structure (mm) | B: second central cell structure (mm) | | | | | | | |
| Comparative Example 1 | — | — | 1.270 | — | — | — | — | 35 | Standard |
| Comparative Example 2 | 0.5 | — | 1.270 | 0.39 | — | 0 | — | 35 | C |

TABLE 2-continued

| | Distance between centers of gravity in honeycomb structure body | | C: cell pitch of outermost circumferential cell structure (mm) | A/C | B/C | Tilt of cell arrangement of first central cell structure (°) | Tilt of cell arrangement of second central cell structure (°) | Porosity of partition walls (%) | Strength evaluation (relative evaluation) |
| | A: first central cell structure (mm) | B: second central cell structure (mm) | | | | | | | |
|---|---|---|---|---|---|---|---|---|---|
| Example 1 | 0.7 | — | 1.270 | 0.55 | — | 0 | — | 35 | B |
| Example 2 | 1.0 | — | 1.270 | 0.79 | — | 0 | — | 35 | B |
| Example 3 | 1.5 | — | 1.270 | 1.18 | — | 0 | — | 35 | B |
| Example 4 | 2.0 | — | 1.270 | 1.57 | — | 0 | — | 35 | B |
| Example 5 | 3.0 | — | 1.270 | 2.36 | — | 0 | — | 35 | A |
| Example 6 | 4.0 | — | 1.270 | 3.15 | — | 0 | — | 35 | A |
| Comparative Example 3 | 0.5 | 0.5 | 1.270 | 0.39 | 0.39 | 0 | 0 | 35 | C |
| Comparative Example 4 | 1.2 | 0.5 | 1.270 | 0.94 | 0.39 | 0 | 0 | 35 | C |
| Example 7 | 1.0 | 0.7 | 1.270 | 0.79 | 0.55 | 0 | 0 | 35 | B |
| Example 8 | 1.5 | 2.0 | 1.270 | 1.18 | 1.57 | 0 | 0 | 35 | B |
| Example 9 | 1.5 | — | 1.270 | 1.18 | — | 10 | — | 35 | B |
| Example 10 | 1.5 | — | 1.270 | 1.18 | — | 30 | — | 35 | A |
| Comparative Example 5 | 0.5 | — | 1.270 | 0.39 | — | 45 | — | 35 | C |
| Example 11 | 1.5 | — | 1.270 | 1.18 | — | 45 | — | 35 | B |
| Example 12 | 2.0 | — | 1.270 | 1.57 | — | 45 | — | 35 | B |
| Example 13 | 3.0 | — | 1.270 | 2.36 | — | 45 | — | 35 | A |
| Example 14 | 4.0 | — | 1.270 | 3.15 | — | 45 | — | 35 | A |
| Example 15 | 1.5 | 2.0 | 1.270 | 1.18 | 1.57 | 45 | 45 | 35 | A |
| Comparative Example 6 | 0.5 | — | 1.270 | 0.39 | — | 0 | — | 35 | C |
| Example 16 | 2.0 | — | 1.270 | 1.57 | — | 0 | — | 35 | B |
| Example 17 | 4.0 | — | 1.270 | 3.15 | — | 0 | — | 35 | B |
| Example 18 | 1.0 | 0.7 | 1.270 | 0.79 | 0.55 | 0 | 0 | 35 | B |
| Example 19 | 1.5 | — | 1.270 | 1.18 | — | 0 | — | 35 | B |
| Example 20 | 3.0 | — | 1.270 | 2.36 | — | 0 | — | 35 | A |
| Example 21 | 3.0 | — | 1.270 | 2.36 | — | 0 | — | 35 | A |
| Example 22 | 3.0 | — | 1.270 | 2.36 | — | 0 | — | 35 | A |
| Example 23 | 3.0 | — | 1.270 | 2.36 | — | 0 | — | 35 | A |
| Example 24 | 3.0 | — | 1.270 | 2.36 | — | 0 | — | 35 | A |
| Example 25 | 3.0 | — | 1.270 | 2.36 | — | 0 | — | 35 | A |

Examples 2 to 25 and Comparative Examples 1 to 6

"A type of cell structure", "presence/absence of a boundary wall" and "the cell structure" were changed as shown in Table 1 and "a distance between centers of gravity in a honeycomb structure body" was changed as shown in Table 2, to prepare honeycomb structures of Examples 2 to 25 and Comparative Examples 1 to 6.

In Examples 7, 8, 15 and 18 and Comparative Examples 3 and 4, a central cell structure had "a first central cell structure" and "a second central cell structure" as shown in Table 1. Additionally, the first central cell structure had a round shape in an end face of the honeycomb structure body, and its diameter was 80 mm. The second central cell structure had a round shape in the end face of the honeycomb structure body, and its diameter was 90 mm.

Furthermore, in Examples 9 to 15 and Comparative Example 5, "a tilt (°) of a cell arrangement of the first central cell structure" and "a tilt (°) of a cell arrangement of the second central cell structure" were changed as shown in Table 2.

Furthermore, in Comparative Example 1, the whole honeycomb structure body comprised one type of cell structure. Table 1 shows a thickness of partition walls, a cell density and a cell shape of the cell structure of the honeycomb structure body of Comparative Example 1 in a column of "a circumferential cell structure".

Examples 26 to 43 and Comparative Examples 7 to 10

"A type of cell structure", "presence/absence of a boundary wall" and "the cell structure" were changed as shown in Table 3 and "a distance between centers of gravity in a honeycomb structure body" was changed as shown in Table 4, to prepare honeycomb structures of Examples 26 to 43 and Comparative Examples 7 to 10.

In Examples 31 to 33, 37 and 40 and Comparative Example 9, a central cell structure had "a first central cell structure" and "a second central cell structure" as shown in Table 3. Additionally, the first central cell structure had a round shape in an end face of the honeycomb structure body, and its diameter was 80 mm. The second central cell structure had a round shape in the end face of the honeycomb structure body, and its diameter was 90 mm.

Furthermore, in Examples 34 to 37, "a tilt (°) of a cell arrangement of the first central cell structure" and "a tilt (°) of a cell arrangement of the second central cell structure" were changed as shown in Table 4.

In Comparative Example 7, the whole honeycomb structure body included one type of cell structure. Table 3 shows a thickness of partition walls, a cell density and a cell shape of the cell structure of the honeycomb structure body of Comparative Example 7 in a column of "a circumferential cell structure".

Examples 44 to 53 and Comparative Examples 11 to 14

"A type of cell structure", "presence/absence of a boundary wall" and "the cell structure" were changed as shown in Table 5 and "a distance between centers of gravity in a honeycomb structure body" and "a porosity of partition walls" were changed as shown in Table 6, to prepare honeycomb structures of Examples 44 to 53 and Comparative Examples 11 to 14.

Furthermore, in Examples 49 to 53 and Comparative Example 14, "a tilt (°) of a cell arrangement of a first central cell structure" was changed as shown in Table 6.

In Comparative Example 11, the whole honeycomb structure body included one type of cell structure. Table 5 shows a thickness of partition walls, a cell density and a cell shape of the cell structure of the honeycomb structure body of Comparative Example 11 in a column of "a circumferential cell structure".

In the honeycomb structures of Examples 2 to 53 and Comparative Examples 1 to 14, the procedure of Example 1 was repeated to perform "isostatic strength evaluation". Table 2, Table 4 and Table 6 show the evaluation results in columns of "strength evaluation (relative evaluation)".

TABLE 3

| | | | Cell structure | | | | | | | |
|---|---|---|---|---|---|---|---|---|---|---|
| | | Presence/ | First central cell structure | | | Second central cell structure | | | Circumferential cell structure | | |
| | Type of cell structure (type) | absence of boundary wall | Thickness of partition walls (mm) | Cell density (cells/cm$^2$) | Cell shape | Thickness of partition walls (mm) | Cell density (cells/cm$^2$) | Cell shape | Thickness of partition walls (mm) | Cell density (cells/cm$^2$) | Cell shape |
| Comparative Example 7 | 1 | — | — | — | — | — | — | — | 0.127 | 46.5 | Quadrangular |
| Comparative Example 8 | 2 | Present | 0.076 | 93.0 | Quadrangular | — | — | — | 0.127 | 46.5 | Quadrangular |
| Example 26 | 2 | Present | 0.076 | 93.0 | Quadrangular | — | — | — | 0.127 | 46.5 | Quadrangular |
| Example 27 | 2 | Present | 0.076 | 93.0 | Quadrangular | — | — | — | 0.127 | 46.5 | Quadrangular |
| Example 28 | 2 | Present | 0.076 | 93.0 | Quadrangular | — | — | — | 0.127 | 46.5 | Quadrangular |
| Example 29 | 2 | Present | 0.076 | 93.0 | Quadrangular | — | — | — | 0.127 | 46.5 | Quadrangular |
| Example 30 | 2 | Present | 0.076 | 93.0 | Quadrangular | — | — | — | 0.127 | 46.5 | Quadrangular |
| Comparative Example 9 | 3 | Present | 0.102 | 93.0 | Quadrangular | 0.076 | 116.25 | Quadrangular | 0.127 | 46.5 | Quadrangular |
| Example 31 | 3 | Present | 0.102 | 93.0 | Quadrangular | 0.076 | 116.25 | Quadrangular | 0.127 | 46.5 | Quadrangular |
| Example 32 | 3 | Present | 0.102 | 93.0 | Quadrangular | 0.076 | 116.25 | Quadrangular | 0.127 | 46.5 | Quadrangular |
| Example 33 | 3 | Present | 0.102 | 93.0 | Quadrangular | 0.076 | 116.25 | Quadrangular | 0.127 | 46.5 | Quadrangular |
| Example 34 | 2 | Present | 0.102 | 93.0 | Quadrangular | — | — | — | 0.127 | 46.5 | Quadrangular |
| Example 35 | 2 | Present | 0.102 | 93.0 | Quadrangular | — | — | — | 0.127 | 46.5 | Quadrangular |
| Example 36 | 2 | Present | 0.102 | 93.0 | Quadrangular | — | — | — | 0.127 | 46.5 | Quadrangular |
| Example 37 | 3 | Present | 0.102 | 93.0 | Quadrangular | 0.076 | 116.25 | Quadrangular | 0.127 | 46.5 | Quadrangular |
| Comparative Example 10 | 2 | None | 0.102 | 93.0 | Quadrangular | — | — | — | 0.127 | 46.5 | Quadrangular |
| Example 38 | 2 | None | 0.102 | 93.0 | Quadrangular | — | — | — | 0.127 | 46.5 | Quadrangular |
| Example 39 | 2 | None | 0.102 | 93.0 | Quadrangular | — | — | — | 0.127 | 46.5 | Quadrangular |
| Example 40 | 3 | None | 0.102 | 93.0 | Quadrangular | 0.076 | 116.25 | Quadrangular | 0.127 | 46.5 | Quadrangular |
| Example 41 | 2 | Present | 0.102 | 93.0 | Hexagonal | — | — | — | 0.127 | 46.5 | Quadrangular |
| Example 42 | 2 | Present | 0.102 | 93.0 | Hexagonal | — | — | — | 0.127 | 46.5 | Quadrangular |
| Example 43 | 2 | Present | 0.102 | 93.0 | Hexagonal | — | — | — | 0.127 | 46.5 | Quadrangular |

TABLE 4

| | Distance between centers of gravity in honeycomb structure body | | C: cell pitch | | | Tilt of cell arrangement | Tilt of cell arrangement | | ISO |
|---|---|---|---|---|---|---|---|---|---|
| | A: first central cell structure (mm) | B: second central cell structure (mm) | of outermost circumferential cell structure (mm) | A/C | B/C | of first central cell structure (°) | of second central cell structure (°) | Porosity of partition walls (%) | strength ratio (relative evaluation) |
| Comparative Example 7 | — | — | 1.466 | — | — | — | — | 35 | Standard |
| Comparative Example 8 | 0.5 | — | 1.466 | 0.34 | — | 0 | — | 35 | C |
| Comparative Example 26 | 0.7 | — | 1.466 | 0.48 | — | 0 | — | 35 | C |
| Example 27 | 1.0 | — | 1.466 | 0.68 | — | 0 | — | 35 | B |
| Example 28 | 1.5 | — | 1.466 | 1.02 | — | 0 | — | 35 | B |
| Example 29 | 3.0 | — | 1.466 | 2.05 | — | 0 | — | 35 | A |
| Example 30 | 4.0 | — | 1.466 | 2.73 | — | 0 | — | 35 | A |
| Comparative Example 9 | 0.5 | 0.7 | 1.466 | 0.34 | 0.48 | 0 | 0 | 35 | C |

TABLE 4-continued

| | Distance between centers of gravity in honeycomb structure body | | C: cell pitch of outermost circumferential cell structure (mm) | | | Tilt of cell arrangement of first central cell structure (°) | Tilt of cell arrangement of second central cell structure (°) | Porosity of partition walls (%) | ISO strength ratio (relative evaluation) |
|---|---|---|---|---|---|---|---|---|---|
| | A: first central cell structure (mm) | B: second central cell structure (mm) | | A/C | B/C | | | | |
| Example 31 | 1.2 | 0.7 | 1.466 | 0.82 | 0.48 | 0 | 0 | 35 | C |
| Example 32 | 0.7 | 1.5 | 1.466 | 0.48 | 1.02 | 0 | 0 | 35 | c |
| Example 33 | 1.5 | 2 | 1.466 | 1.02 | 1.36 | 0 | 0 | 35 | B |
| Example 34 | 1.5 | — | 1.466 | 1.02 | — | 10 | — | 35 | B |
| Example 35 | 1.5 | — | 1.466 | 1.02 | — | 30 | — | 35 | A |
| Example 36 | 1.5 | — | 1.466 | 1.02 | — | 45 | — | 35 | A |
| Example 37 | 1.5 | 2 | 1.466 | 1.02 | 1.36 | 45 | 45 | 35 | A |
| Comparative Example 10 | 0.5 | — | 1.466 | 0.34 | — | 0 | — | 35 | C |
| Example 38 | 2.0 | — | 1.466 | 1.36 | — | 0 | — | 35 | B |
| Example 39 | 4.0 | — | 1.466 | 2.73 | — | 0 | — | 35 | B |
| Example 40 | 1.0 | 0.8 | 1.466 | 0.68 | 0.55 | 0 | 0 | 35 | B |
| Example 41 | 1.5 | — | 1.466 | 1.02 | — | 0 | — | 35 | B |
| Example 42 | 2.0 | — | 1.466 | 1.36 | — | 0 | — | 35 | B |
| Example 43 | 4.0 | — | 1.466 | 2.73 | — | 0 | — | 35 | A |

TABLE 5

| | Type of cell structure (type) | Presence/ absence of boundary wall | Cell structure | | | | | |
|---|---|---|---|---|---|---|---|---|
| | | | First central cell structure | | | Circumferential cell structure | | |
| | | | Thickness of partition walls (mm) | Cell density (cells/cm²) | Cell shape | Thickness of partition walls (mm) | Cell density (cells/cm²) | Cell shape |
| Comparative Example 11 | 1 | — | — | — | — | 0.203 | 46.5 | Quadrangular |
| Comparative Example 12 | 2 | Present | 0.152 | 62.0 | Quadrangular | 0.203 | 46.5 | Quadrangular |
| Comparative Example 13 | 2 | Present | 0.152 | 62.0 | Quadrangular | 0.203 | 46.5 | Quadrangular |
| Example 44 | 2 | Present | 0.152 | 62.0 | Quadrangular | 0.203 | 46.5 | Quadrangular |
| Example 45 | 2 | Present | 0.152 | 62.0 | Quadrangular | 0.203 | 46.5 | Quadrangular |
| Example 46 | 2 | Present | 0.152 | 62.0 | Quadrangular | 0.203 | 46.5 | Quadrangular |
| Example 47 | 2 | Present | 0.152 | 62.0 | Quadrangular | 0.203 | 46.5 | Quadrangular |
| Example 48 | 2 | Present | 0.152 | 62.0 | Quadrangular | 0.203 | 46.5 | Quadrangular |
| Comparative Example 14 | 2 | Present | 0.152 | 62.0 | Quadrangular | 0.203 | 46.5 | Quadrangular |
| Example 49 | 2 | Present | 0.152 | 62.0 | Quadrangular | 0.203 | 46.5 | Quadrangular |
| Example 50 | 2 | Present | 0.152 | 62.0 | Quadrangular | 0.203 | 46.5 | Quadrangular |
| Example 51 | 2 | Present | 0.152 | 62.0 | Quadrangular | 0.203 | 46.5 | Quadrangular |
| Example 52 | 2 | Present | 0.152 | 62.0 | Quadrangular | 0.203 | 46.5 | Quadrangular |
| Example 53 | 2 | Present | 0.152 | 62.0 | Quadrangular | 0.203 | 46.5 | Quadrangular |

TABLE 6

| | Distance between centers of gravity in honeycomb structure body A: first central cell structure (mm) | C: cell pitch of outermost circumferential cell structure (mm) | A/C | Tilt of cell arrangement of first central cell structure (°) | Porosity of partition walls (%) | ISO strength ratio (relative evaluation) |
|---|---|---|---|---|---|---|
| Comparative Example 11 | — | 1.466 | — | — | 65 | Standard |
| Comparative Example 12 | 0.5 | 1466 | 0.34 | 0 | 65 | C |
| Comparative Example 13 | 0.7 | 1.466 | 0.48 | 0 | 65 | C |

TABLE 6-continued

|  | Distance between centers of gravity in honeycomb structure body A: first central cell structure (mm) | C: cell pitch of outermost circumferential cell structure (mm) | A/C | Tilt of cell arrangement of first central cell structure (°) | Porosity of partition walls (%) | ISO strength ratio (relative evaluation) |
|---|---|---|---|---|---|---|
| Example 44 | 1.0 | 1.466 | 0.68 | 0 | 65 | B |
| Example 45 | 1.5 | 1.466 | 1.02 | 0 | 65 | B |
| Example 46 | 2.0 | 1.466 | 1.36 | 0 | 65 | B |
| Example 47 | 3.0 | 1.466 | 2.05 | 0 | 65 | A |
| Example 48 | 4.0 | 1.466 | 2.73 | 0 | 65 | A |
| Comparative Example 14 | 0.7 | 1.466 | 0.48 | 45 | 65 | C |
| Example 49 | 1.0 | 1.466 | 0.68 | 45 | 65 | B |
| Example 50 | 1.5 | 1.466 | 1.02 | 45 | 65 | B |
| Example 51 | 2.0 | 1.466 | 1.36 | 45 | 65 | B |
| Example 52 | 3.0 | 1.466 | 2.05 | 45 | 65 | A |
| Example 53 | 4.0 | 1.466 | 2.73 | 45 | 65 | A |

Result

In honeycomb structures of Examples 1 to 53, each isostatic strength was higher than that of a honeycomb structure of a comparative example which was a standard. Furthermore, it has been found that in a case where a distance between a center of gravity of a central cell structure and a center of gravity of a honeycomb structure body (i.e., a distance between centers of gravity) is larger than a length of a half of a cell pitch of an outermost circumferential cell structure, the isostatic strength effectively improves.

Furthermore, it has been found that when "a tilt (°) of a cell arrangement of a first central cell structure" and "a tilt (°) of a cell arrangement of a second central cell structure" are closer to 45° in a case where a cell shape is a quadrangular shape, the isostatic strength improves.

Furthermore, it has been found that even when a porosity of partition walls is low as in honeycomb structures of Examples 1 to 43 and the porosity of the partition walls is high as in honeycomb structures of Examples 44 to 53, the distance between the centers of gravity is increased to effectively improve the isostatic strength.

A honeycomb structure of the present invention can be utilized as a catalyst carrier onto which a catalyst is loaded to purify an exhaust gas emitted from a gasoline engine, a diesel engine or the like, or as a filter to purify the exhaust gas.

DESCRIPTION OF REFERENCE NUMERALS

1: partition wall, 2: cell, 2a: cell (the cell of a central cell structure), 2b: cell (the cell of an outermost circumferential cell structure), 2x: complete cell, 3: circumferential wall, 4: honeycomb structure body, 8 and 9: boundary wall, 11: inflow end face, 12: outflow end face, 15: central cell structure, 15a: first central cell structure, 15b: second central cell structure, 16: circumferential cell structure, 16a: outermost circumferential cell structure, 18: maximum inscribed circle, 100: honeycomb structure, d: diameter (the diameter of an inscribed circle), O1: center of gravity (a geometric center of gravity of the honeycomb structure body), O2: center of gravity (a geometric center of gravity of the central cell structure), O3: center of gravity (a geometric center of gravity of a second central cell structure), P: cell pitch, and t: partition wall thickness.

What is claimed is:

1. A honeycomb structure comprising:
a pillar-shaped honeycomb structure body having porous partition walls defining a plurality of cells which extend from an inflow end face to an outflow end face and function as through channels for a fluid,
wherein as to the honeycomb structure body, in a plane perpendicular to an extending direction of the plurality of cells, a cell structure of a central cell structure comprising the plurality of cells formed in a central portion differs from a cell structure of an outermost circumferential cell structure comprising the plurality of cells formed in a circumferential portion arranged immediately radially outward from the central cell structure,
wherein the outermost circumferential cell structure comprises one cell structure and the central cell structure comprises one or more cell structures which are present on an inner side of the outermost circumferential cell structure,
wherein the cell density in the central cell structure is from 80 to 150 cells/cm$^2$ and the cell density in the outermost circumferential cell structure is from 30 to 80 cells/cm$^2$, and
wherein in the plane perpendicular to the cell extending direction, a geometric center of gravity of the honeycomb structure body exists at a position which is away from a geometric center of gravity of the cell structure if the central cell structure comprises one cell structure, and each of the geometric centers of gravity of each of the cell structures when the central cell structure comprises two or more cell structures, and a distance between the respective centers of gravity is larger than a length of larger than 2.00 times a cell pitch and 3.15 times or less than the cell pitch of the outermost circumferential cell structure including complete cells foiled at an outermost circumference of the honeycomb structure body in the outermost circumferential cell structure, in a case where among the plurality of cells, cells having all peripheries defined by the partition walls are defined as the complete cells.

2. The honeycomb structure according to claim 1, wherein in the plane perpendicular to the cell extending direction, the distance between the center of gravity of the honeycomb structure body and the center of gravity of the central cell structure is larger than a length of the cell pitch of the outermost circumferential cell structure.

3. The honeycomb structure according to claim 1, wherein the honeycomb structure body has a porous boundary wall in a boundary portion between the outermost circumferential cell structure and the central cell structure.

4. The honeycomb structure according to claim 1, wherein in the honeycomb structure body, the boundary portion between the outermost circumferential cell structure and the central cell structure comprises continuous or discontinuous partition walls.

5. The honeycomb structure according to claim 1, wherein a cell density of the central cell structure is larger than a cell density of the outermost circumferential cell structure.

6. The honeycomb structure according to claim 1, wherein the central cell structure comprises two or more cell structures having different cell densities.

7. The honeycomb structure according to claim 1, wherein a cell shape of all the complete cells is a quadrangular shape, and an arrangement direction of repeating units of the cells in the central cell structure tilts as much as 10° or more and 45° or less to an arrangement direction of repeating units of the cells in the outermost circumferential cell structure.

8. The honeycomb structure according to claim 1, wherein all of the complete cells in the central cell structure have the same size and shape.

* * * * *